(12) United States Patent
Kurita

(10) Patent No.: US 7,931,411 B2
(45) Date of Patent: Apr. 26, 2011

(54) OPTICAL TRANSMISSION APPARATUS TO WHICH OPTICAL CABLE IS CONNECTED

(75) Inventor: Yoichiro Kurita, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 6 days.

(21) Appl. No.: 12/461,725

(22) Filed: Aug. 21, 2009

(65) Prior Publication Data

US 2009/0310921 A1    Dec. 17, 2009

(30) Foreign Application Priority Data

Sep. 3, 2008  (JP) ................................. 2008-225765

(51) Int. Cl.
*G02B 6/36* (2006.01)
(52) U.S. Cl. ................. 385/88; 385/14; 385/53; 385/89
(58) Field of Classification Search ..................... 385/14, 385/53, 88, 89
See application file for complete search history.

(56) References Cited

U.S. PATENT DOCUMENTS 7,625,633 B2 * 12/2009 Kawaguchi et al. ....... 428/411.1
7,837,476 B2 * 11/2010 Di Stefano ...................... 439/66

FOREIGN PATENT DOCUMENTS

JP        2006-59883 A    3/2006

* cited by examiner

*Primary Examiner* — Jennifer Doan
(74) *Attorney, Agent, or Firm* — McGinn IP Law Group, PLLC

(57) ABSTRACT

An optical transmission apparatus includes a wiring board, an electronic device mounted on the wiring board, a connection part that mechanically connects the electronic device and the wiring board to each other in such a manner that the electronic device and the wiring board face each other at a certain distance and electrically connects the electronic device and the wiring board to each other, an optical cable connector that is in contact with the electronic device, and an optical cable connected to the optical cable connector. The optical cable connector has a part that is inserted between the electronic device and the wiring board. A signal is transmitted between the part and the electronic device.

12 Claims, 26 Drawing Sheets

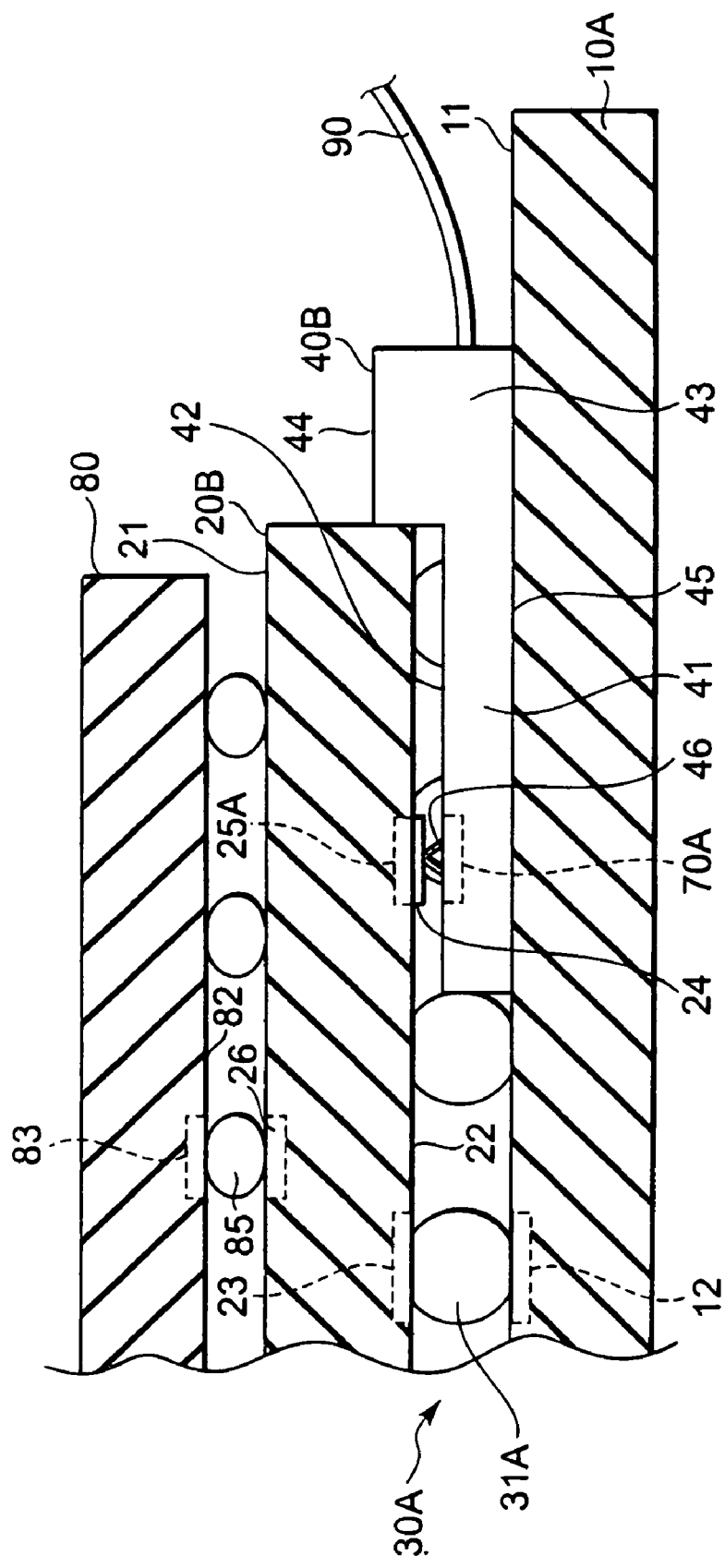

B-B'

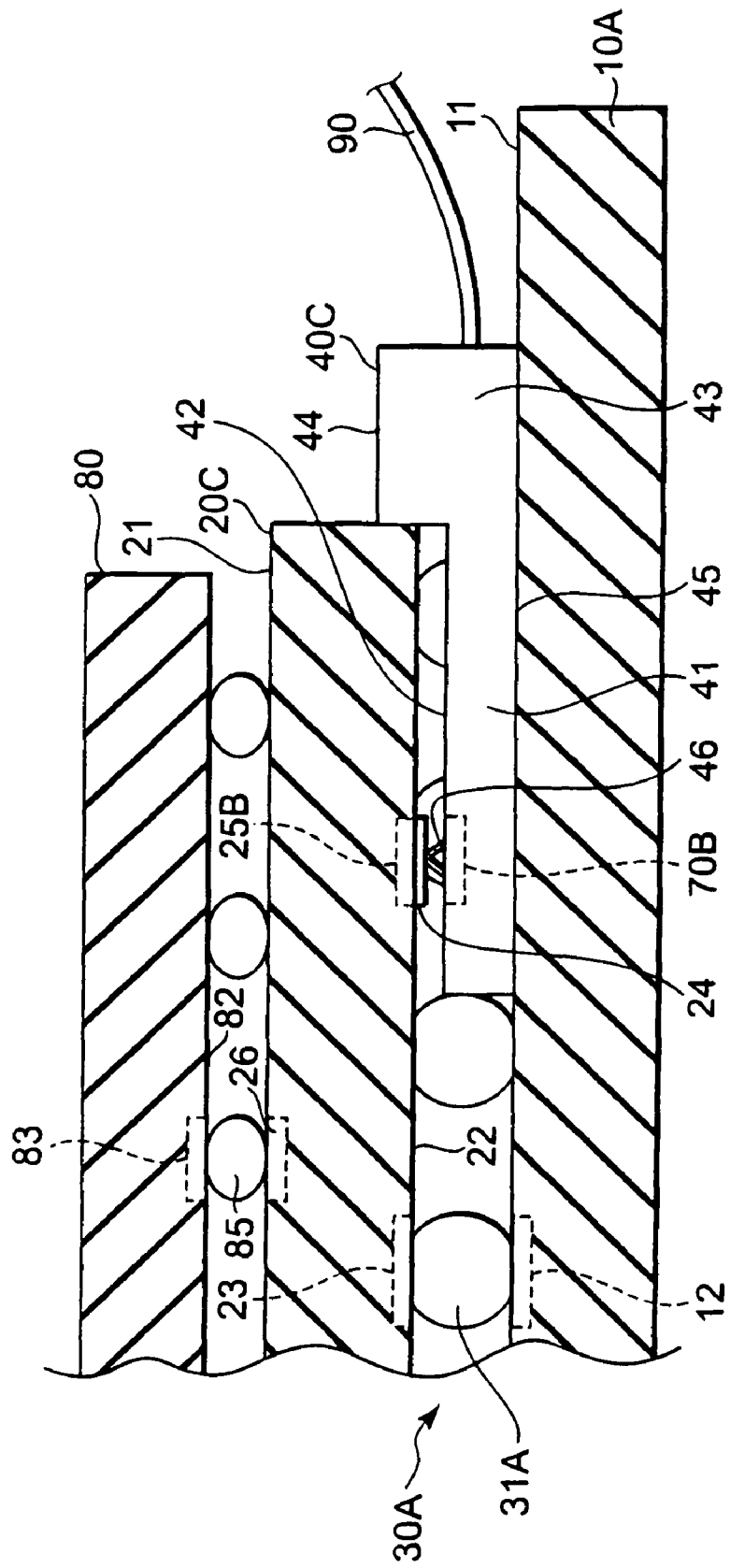

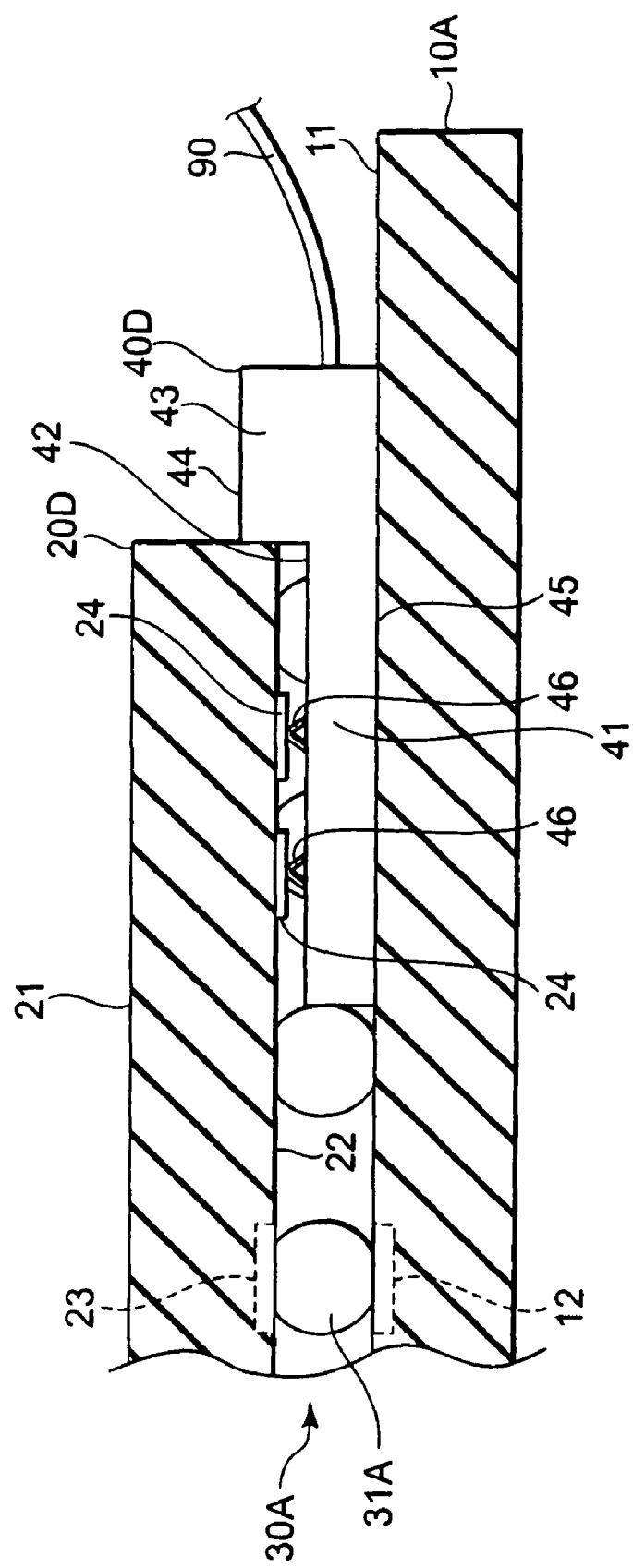

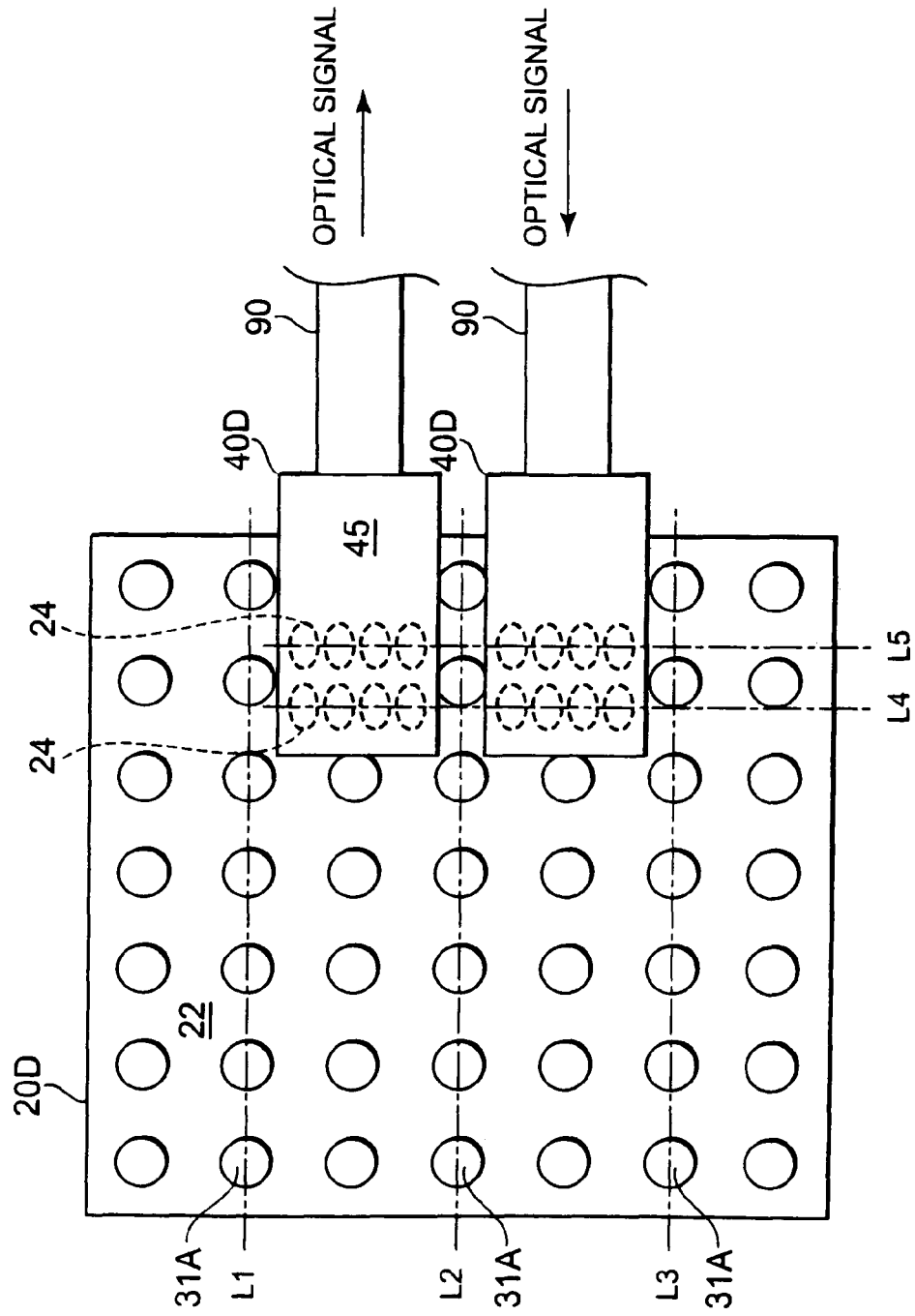

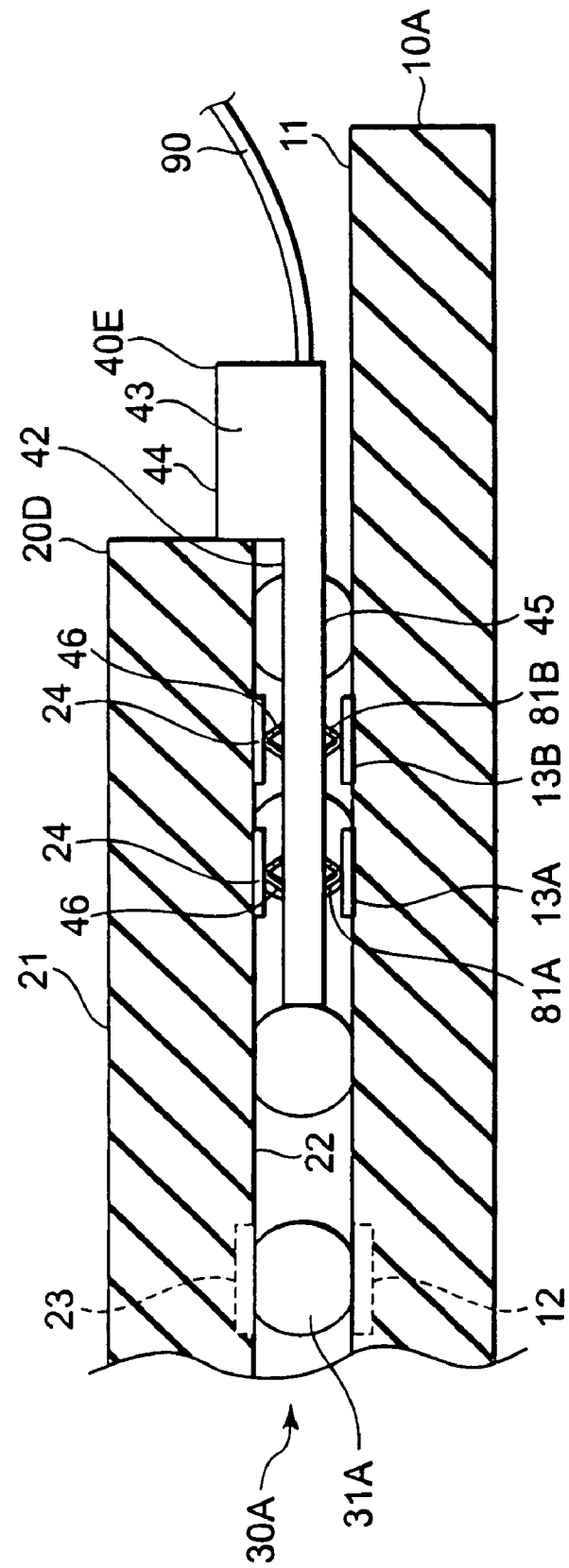

OPTICAL TRANSMISSION APPARATUS TO WHICH OPTICAL CABLE IS CONNECTED

BACKGROUND OF THE INVENTION

1. Field of the Invention

The present invention relates to an optical transmission apparatus.

2. Description of Related Art

Japanese Patent Laid-Open No. 2006-59883 discloses a conventional large-scale integrated circuit (LSI) package with an interface module. FIG. 1 is a diagram for illustrating a process of manufacturing the conventional LSI package with an interface module. The LSI package with an interface module has a signal processing LSI 102. The signal processing LSI 102 is mounted on an interposer 103, and the signal processing LSI 102 and the interposer 103 are electrically connected to each other.

High speed signal wiring 104 provided on the interposer 103 is electrically connected to a signal input/output terminal of the signal processing LSI 102 at one end. The other end of the high speed signal wiring 104 is drawn on the top surface of the interposer 103. Connection terminals 105 used for power supply or input/output of a low speed control signal are disposed on the bottom surface of the interposer 103. The connection terminals 105 are electrically connected to a mounting board 106.

An optical interface module 107 has an interface integrated circuit (IC), an optical element, an optical fiber 108 for high speed signal transmission, an optical coupling system for the optical fiber 108 and the optical element, and a flexible wiring board 109 and is mounted on a stiffener 110, which serves as a supporting substrate. The optical interface module 107 has two types of input/output parts. One of the input/output parts is an input/output pin 112, which is disposed at a position close to the mounting board 106 and is used for transmission of a low speed control signal or power supply signal. The input/output pin 112 is connected to a socket 113 mounted on the mounting board 106. The other input/output part is an electrical connection part 114, which electrically connects the optical interface module 107 and the high speed signal wiring 104 to each other and is used for high speed signal transmission. The electrical connection part 114 is spaced apart from the high speed signal wiring 104 by a predetermined distance by a protrusion 115. The electrical connection part 114 is inductively or capacitively coupled to the high speed signal wiring 104.

A process of manufacturing the LSI package with an interface module will be described. First, the interposer 103 with the signal processing LSI 102 mounted thereon is electrically connected to the mounting board 106 with the connection terminals 105. At the same time, the socket 113 and other components are mounted on the mounting board 106. Then, an electrode of the high speed signal wiring 104 and an electrode of the electrical connection part 114 are aligned with each other. Then, the input/output pin 112 is fitted into the socket 113, and at the same time, the optical interface module 107 and the high speed signal wiring 104 are electrically connected to each other with the electrical connection part 114.

The inventor has recognized the following problem with the conventional LSI package with an interface module. That is, the LSI package with an interface module is expensive because the interposer 103 is necessary to connect the optical interface module 107 to the signal processing LSI 102 and the socket 113 is necessary to transmit the power supply signal.

SUMMARY

According to one aspect of the present invention, an optical transmission apparatus includes a wiring board, an electronic device mounted on the wiring board, a connection part that mechanically connects the electronic device and the wiring board to each other in such a manner that the electronic device and the wiring board face each other at a certain distance and electrically connects the electronic device and the wiring board to each other, an optical cable connector that is in contact with the electronic device or the connection part, and an optical cable connected to the optical cable connector. The optical cable connector includes a first part that is inserted between the electronic device and the wiring board. A signal is transmitted between the first part and the electronic device.

According to the present invention, an inexpensive optical transmission apparatus is provided.

BRIEF DESCRIPTION OF THE DRAWINGS

The above and other objects, advantages and features of the present invention will be more apparent from the following description of certain preferred modes taken in conjunction with the accompanying drawings, in which:

FIG. 11 is a side view of an optical transmission apparatus according to a second embodiment of the present invention;

FIG. 14 is a side view of an optical transmission apparatus according to a third embodiment of the present invention;

FIG. 17 is a side view of an optical transmission apparatus according to a fourth embodiment of the present invention;

FIG. 18 is a plan view showing an arrangement of an electronic device and optical cable connectors in the optical transmission apparatus according to the fourth embodiment;

FIG. 19 is a side view of an optical transmission apparatus according to a fifth embodiment of the present invention;

DETAILED DESCRIPTION OF PREFERRED EMBODIMENTS

Referring now to the attached drawings, an optical transmission apparatus according to a first embodiment of the present invention will be described.

First Embodiment

Figure 1:
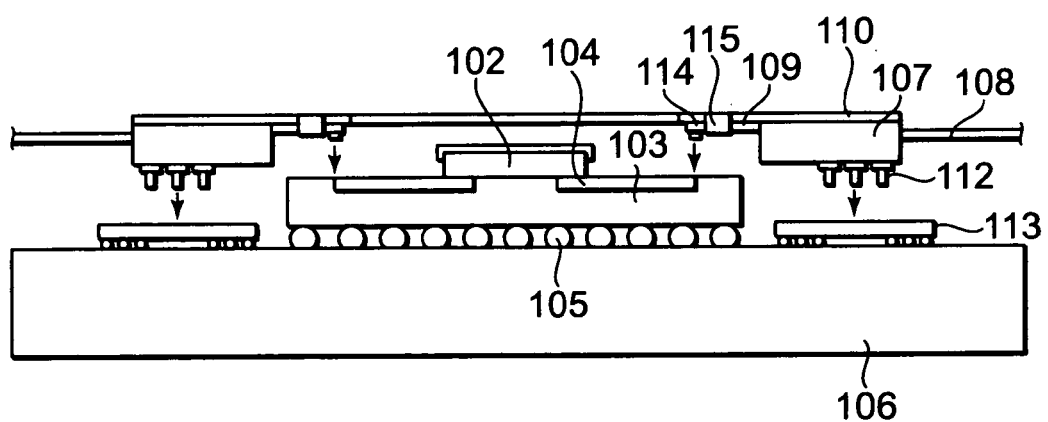
FIG. 1 is a diagram for illustrating a process of manufacturing a conventional LSI package with an interface module.
Figure 2:
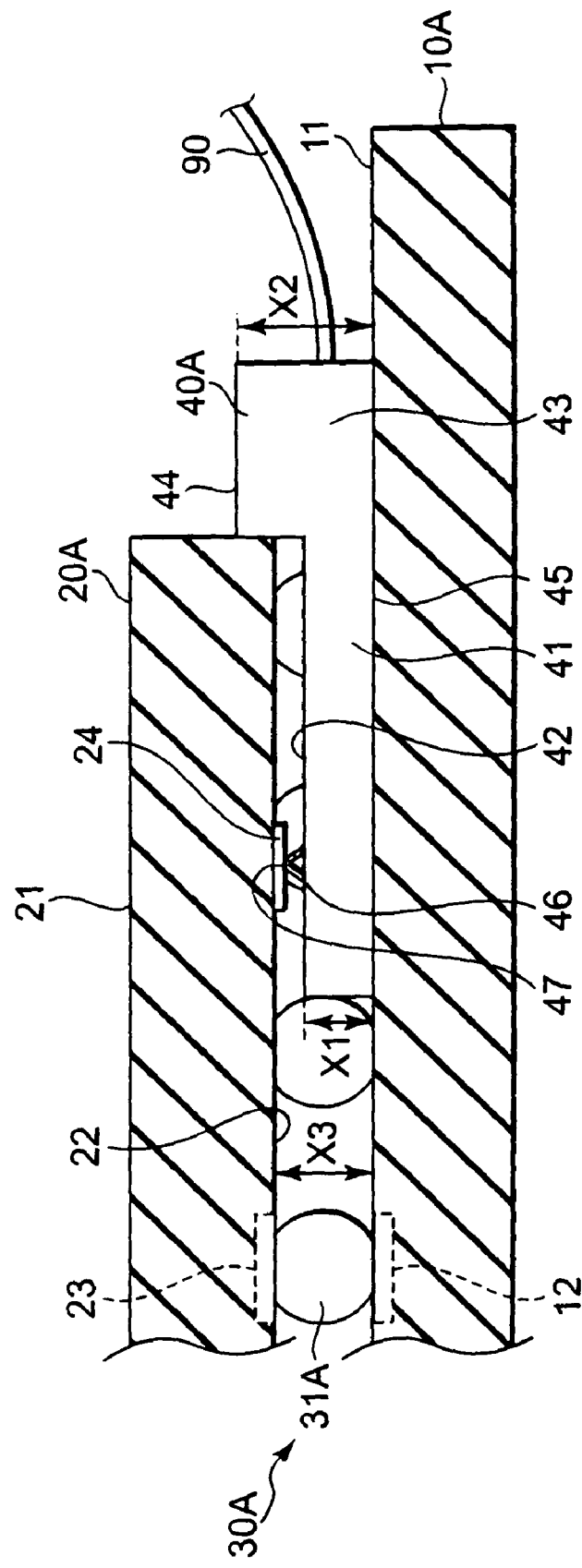
FIG. 2 is a side view of an optical transmission apparatus according to a first embodiment of the present invention.

As shown in FIG. 2, an optical transmission apparatus according to a first embodiment of the present invention comprises a wiring board 10A, an electronic device 20A mounted on the wiring board 10A, a connection part 30A, an optical cable connector 40A, and an optical cable 90 connected to the optical cable connector 40A. The wiring board 10A is sometimes referred to also as a system board or a motherboard. The electronic device 20A is a semiconductor device, such as a semiconductor chip and a semiconductor package. A semiconductor chip may be mounted on the electronic device 20A that serves as a semiconductor package. The connection part 30A mechanically connects the electronic device 20A and the wiring board 10A to each other in such a manner that the electronic device 20A and the wiring board 10A are opposed to each other at a certain distance X3. At the same time, the connection part 30A electrically connects the electronic device 20A and the wiring board 10A to each other. The connection part 30A supports the electronic device 20A above the wiring board 10A and maintains the distance X3. The optical cable connector 40A has an inserting part 41 that is placed in contact with the electronic device 20A and the wiring board 10A between the electronic device 20A and the wiring board 10A and a stopper part 43 that is not inserted between the electronic device 20A and the wiring board 10A. The optical cable 90 is an optical cable or optical waveguide.

Signal transmission occurs between the inserting part 41 and the electronic device 20A. For example, the signal is transmitted from an external apparatus to the electronic device 20A through the optical cable 90 and the optical cable connector 40A. Alternatively, the signal may be transmitted from the electronic device 20A to an external apparatus through the optical cable connector 40A and the optical cable 90.

According to this embodiment, the inserting part 41 inserted between the electronic device 20A and the wiring board 10A is in contact with the electronic device 20A and the wiring board 10A. Therefore, without an additional mechanism for fixing the optical cable connector 40A to the electronic device 20A, the optical cable connector 40A and the electronic device 20A are connected to each other so that signal transmission can occur between the inserting part 41 and the electronic device 20A. Since no additional fixing mechanism is needed, the cost of the optical transmission apparatus according to this embodiment is reduced.

The electronic device 20A has an upper surface 21, a lower surface 22 opposite to the upper surface 21, and a plurality of electrodes 24 provided on the lower surface 22. The upper surface 21 and the lower surface 22 are sometimes referred to also as a front surface 21 and a rear surface 22, respectively. The electrodes 24 may or may not protrude from the lower surface 22. The wiring board 10A has an upper surface 11 that faces the lower surface 22 at the distance X3. The upper surface 11 is sometimes referred to also as a front surface 11. The connection part 30A is a ball grid array and has a plurality of connecting bodies 31A. Each connecting body 31A is a solder ball that connects an electrode 23 on the lower surface 22 and an electrode 12 on the upper surface 11 to each other.

The optical cable connector 40A has a lower surface 45 that faces the upper surface 11. The lower surface 45 is sometimes referred to also as a rear surface 45. The inserting part 41 has an inserting-part upper surface 42, and the stopper part 43 has a stopper-part upper surface 44. The inserting-part upper surface 42 and the stopper-part upper surface 44 are sometimes referred to also as an inserting-part front surface 42 and a stopper-part front surface 44. The inserting-part upper surface 42 is opposite to the lower surface 45 of the inserting part 41 and faces the lower surface 22. The stopper-part upper surface 44 is opposite to the lower surface 45 of the stopper part 43. The thickness X1 of the inserting part 41 (the distance between the inserting-part upper surface 42 and the lower surface 45) is smaller than the distance X3. The thickness X2 of the stopper part 43 (the distance between the stopper-part upper surface 44 and the lower surface 45) is larger than the distance X3. The optical cable connector 40A has a plurality of spring members 46 provided on the inserting part 41. The plurality of spring members 46 are associated with the plurality of electrodes 24 in a one-to-one relationship. Each spring member 46 is made of a conductor and has a contact surface 47. Each contact surface 47 is in contact with one of the plurality of electrodes 24. The lower surface 45 is in contact with the upper surface 11. Each spring member 46 presses its own contact surface 47 against the associated electrode 24 and presses the lower surface 45 against the upper surface 11. The number of pairs of electrodes 24 and spring members 46 can be changed as required. The spring members 46 are elastic metal protrusions, for example. The metal protrusions protrude from the inserting-part upper surface 42 and are in contact with the electrodes 24. The lower surface 45 is pressed against the upper surface 11 by the action of the elastic force of the metal protrusions.

Since the inserting part 41 of the optical transmission apparatus according to this embodiment is disposed between the electronic device 20A and the wiring board 10A, the electrodes 24 can be formed by a wiring layer in which the electrodes 23 are formed. Therefore, the electronic device 20A needs no additional wiring layer for connection to the optical cable connector 40A, and the cost of the optical transmission apparatus is reduced.

Figure 3:
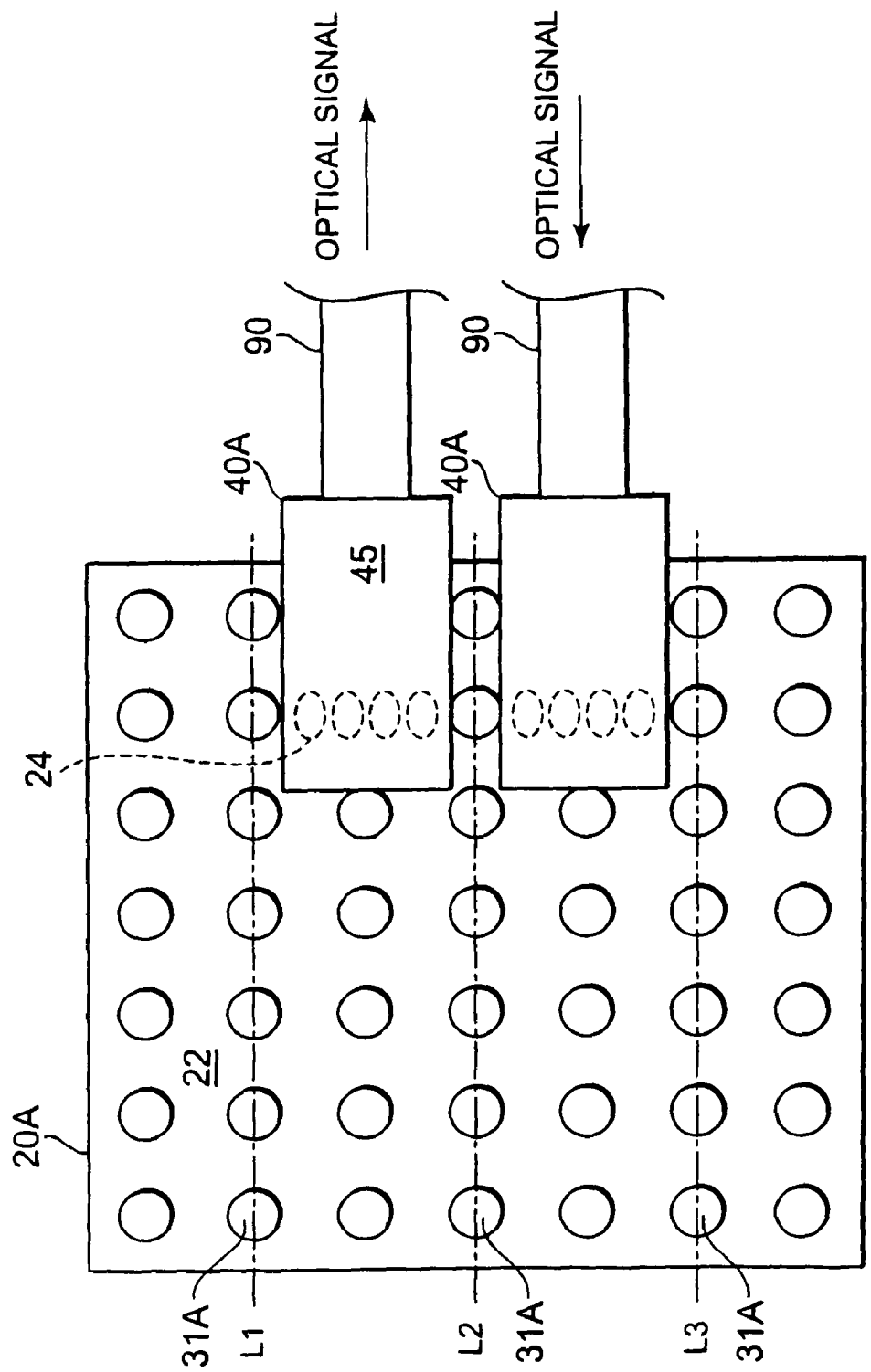
FIG. 3 is a plan view showing an arrangement of an electronic device and optical cable connectors in the optical transmission apparatus according to the first embodiment.

As shown in FIG. 3, the optical transmission apparatus according to this embodiment can have two optical cable connectors 40A, one of which serves as a first optical cable connector, and the other of which serves as a second optical cable connector. The connection part 30A includes a plurality of connecting bodies 31A arranged along a straight line L1, a plurality of connecting bodies 31A arranged along a straight line L2 parallel to the straight line L1, and a plurality of connecting bodies 31A arranged along a straight line L3 parallel to the straight line L2. The inserting part 41 of the first optical cable connector 40A is disposed between the plurality of connecting bodies 31A arranged along the straight line L1 and the plurality of connecting bodies 31A arranged along the straight line L2. The inserting part 41 of the second optical cable connector 40A is disposed between the plurality of connecting bodies 31A arranged along the straight line L2 and the plurality of connecting bodies 31A arranged along the straight line L3. The first optical cable connector 40A and the optical cable 90 connected thereto are used for signal transmission from the electronic device 20A to an external apparatus. The second optical cable connector 40A and the optical cable 90 connected thereto are used for signal transmission from an external apparatus to the electronic device 20A.

Figure 4:
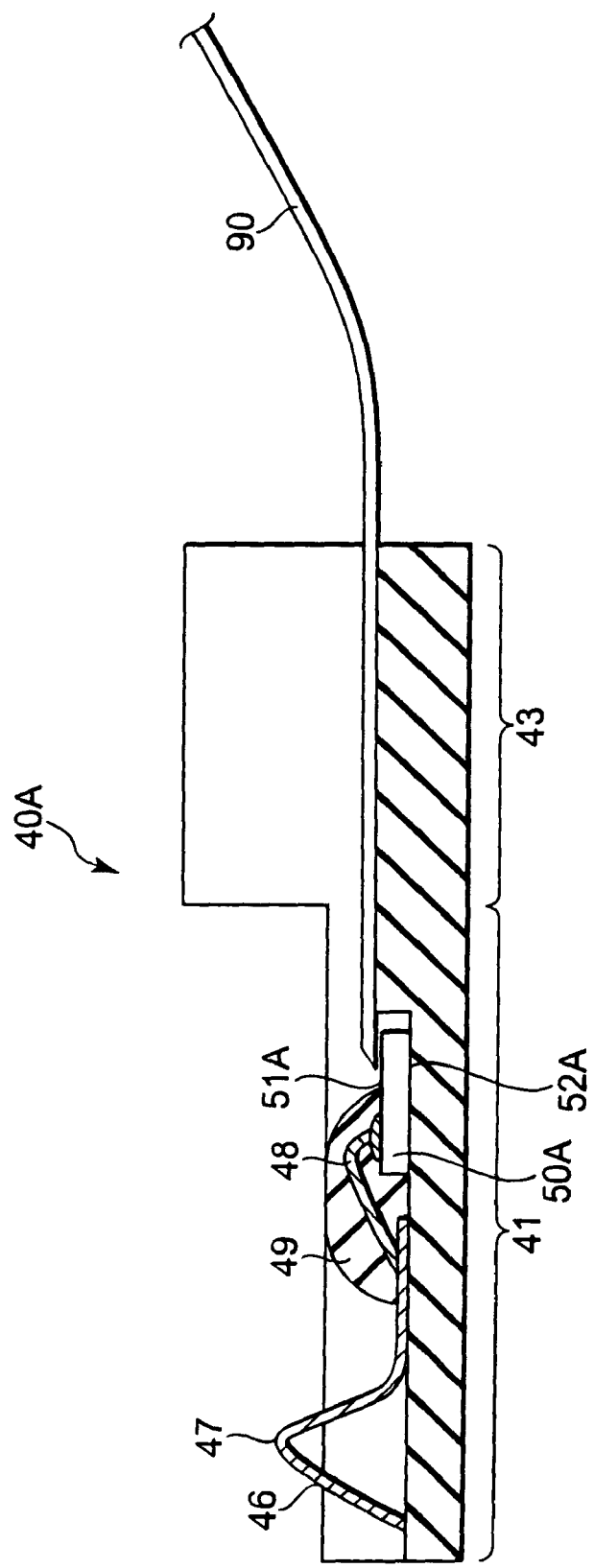
FIG. 4 is a cross-sectional view of the optical cable connector.

As shown in FIG. 4, the optical cable connector 40A has a signal converting element 50A. The signal converting element 50A is optically coupled to the optical cable 90. The signal converting element 50A has a front surface 51A on which a signal converting layer is formed and a rear surface 52A opposite to the front surface 51A. The signal converting element 50A is disposed on the inserting part 41, for example. The end of the optical cable 90 is opposed to the front surface 51A. Each spring member 46 is connected to the front surface 51A with a wire 48. The wire 48 is sealed with a sealing resin 49. The pairs of the spring members 46 and the electrodes 24 include pairs used for electrical signal transmission between the electronic device 20A and the signal converting element 50A and pairs used for power supply from the electronic device 20A to the signal converting element 50A via the spring members 46. For the pairs used for electrical signal transmission, the spring member 46 forms a connector-side signal connection part, and the electrode 24 forms an electronic-device-side signal connection part. For the pairs used for power supply, the spring member 46 forms a connector-side power supply connection part, and the electrode 24 forms an electronic-device-side power supply connection part. Electrical signal transmission between the electronic device 20A and the signal converting element 50A occurs between the spring members 46 and the electrodes 24 forming the pairs for electrical signal transmission. The signal converting element 50A converts the optical signal transmitted through the optical cable 90 into the electrical signal and vice versa. The signal converting element 50A is a light emitting element of the surface emitting type, such as a surface emitting laser and a light emitting diode, or a light receiving element of the surface receiving type, such as a phototransistor and a photodiode. The light emitting element and the light receiving element are referred to also as an optical element.

The electronic device 20A or optical cable connector 40A may incorporate a laser driver that drives the surface emitting laser and an amplifier that amplifies the electrical signal converted from the optical signal by the light receiving element. Furthermore, an optical system, such as a lens, may be provided between the signal converting element 50A and the end of the optical cable 90.

In the following, variations of the optical cable connector 40A will be described with reference to FIGS. 5 to 7.

Figure 5:
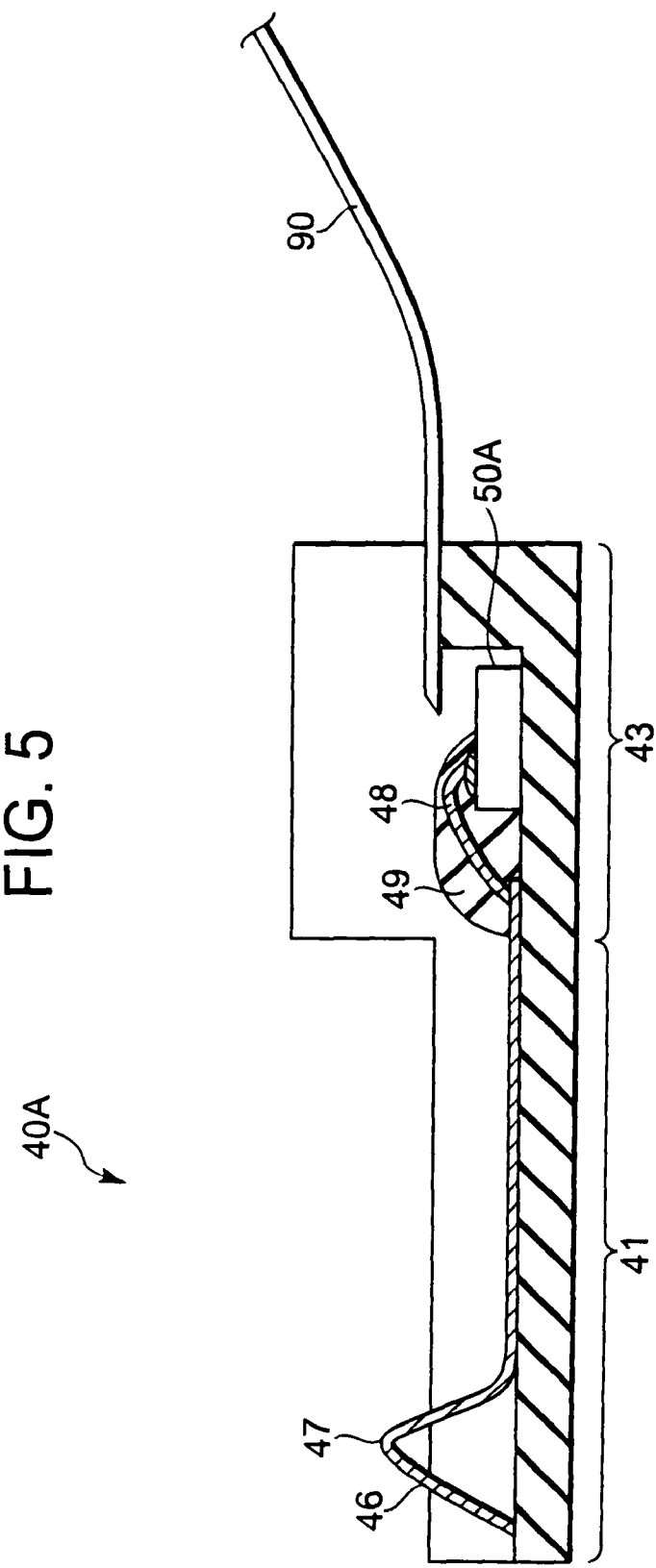
FIG. 5 is a first variation of the optical cable connector.

As shown in FIG. 5, the signal converting element 50A may be disposed on the stopper part 43.

Figure 6:
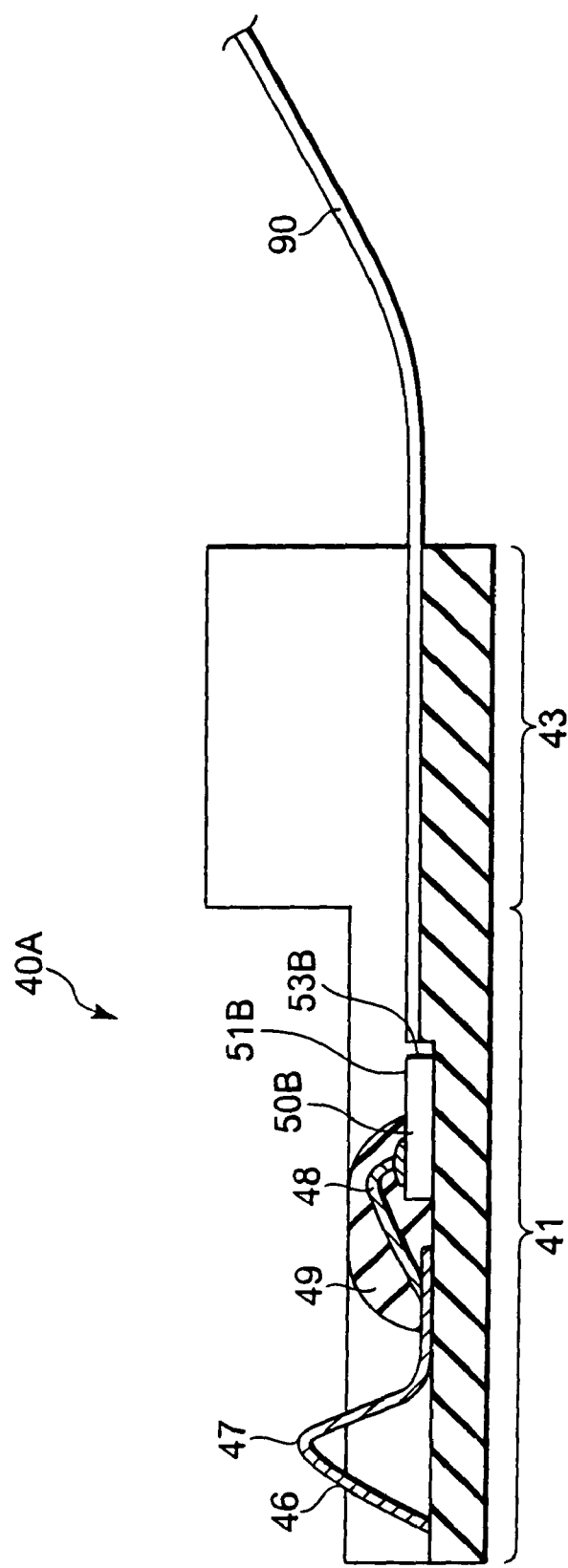
FIG. 6 is a second variation of the optical cable connector.

As shown in FIG. 6, the signal converting element 50A may be replaced with a signal converting element 50B. The signal converting element 50B also converts the optical signal transmitted through the optical cable 90 into the electrical signal and vice versa. The signal converting element 50B is a light emitting element of the edge emitting type, such as an edge emitting laser, or a light receiving element of the edge receiving type. The signal converting element 50B has a front surface 51B on which a signal converting layer is formed and a cleavage surface 53B. Each spring member 46 is connected to the front surface 51B by a wire 48. The end of the optical cable 90 is opposed to the cleavage surface 53B.

Figure 7:
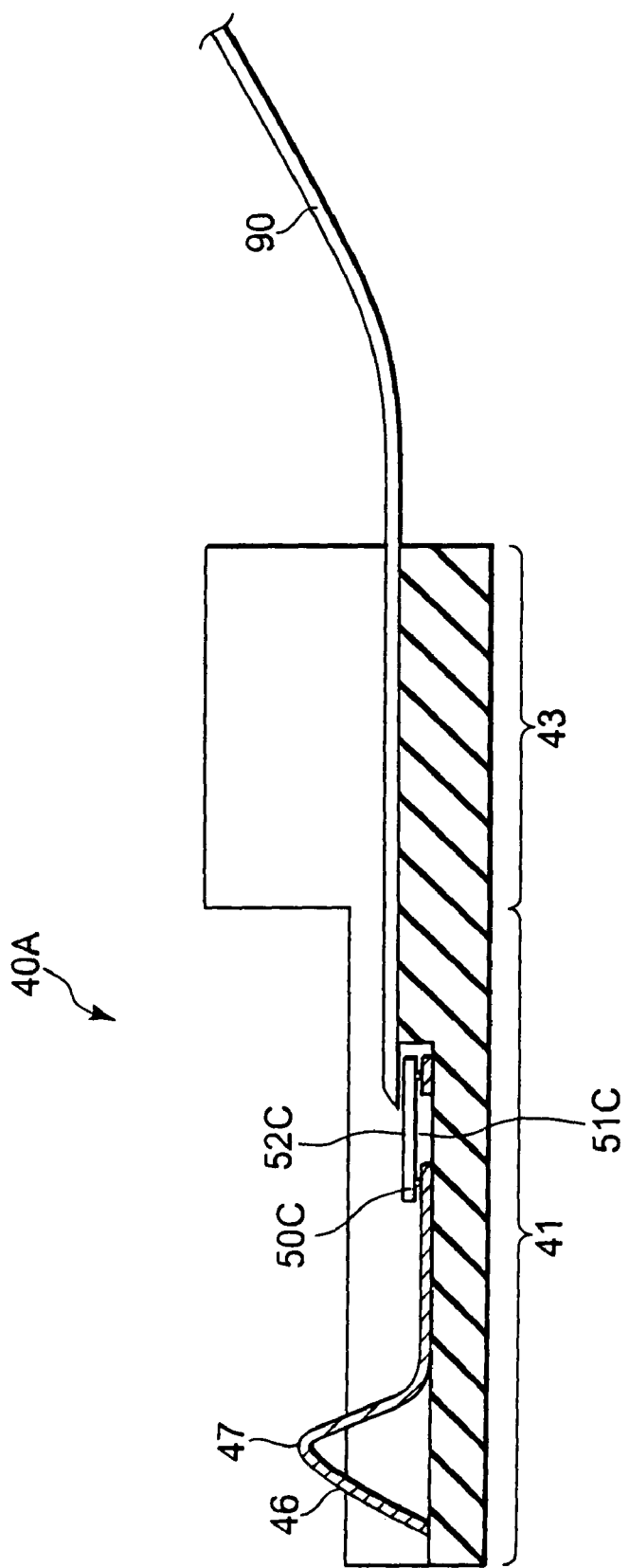
FIG. 7 is a third variation of the optical cable connector.

As shown in FIG. 7, the signal converting element 50A may be replaced with a signal converting element 50C. The signal converting element 50C also converts the optical signal transmitted through the optical cable 90 into the electrical signal and vice versa. The signal converting element 50C is a light emitting element of the surface emitting type or a light receiving element of the surface receiving type. The signal converting element 50C has a front surface 51C on which a signal converting layer is formed and a rear surface 52C opposite to the front surface 51C. The front surface 51C is connected to each spring member 46 by flip chip bonding (bump bonding). The end of the optical cable 90 is opposed to the rear surface 52C.

In the following, a method of manufacturing the optical transmission apparatus according to this embodiment will be described.

Referring to FIG. 2, the electronic device 20A is first mounted on the wiring board 10A. The electronic device 20A and the wiring board 10A are mechanically connected to each other by reflowing of the connection part 30A, for example, so that the electronic device 20A and the wiring board 10A are opposed to each other at the certain distance X3. As a result, the electronic device 20A and the wiring board 10A are electrically connected to each other by the connection part 30A.

Then, the inserting part 41 is inserted between the electronic device 20A and the wiring board 10A in such a manner that the contact surface 47 of the inserting part 41 is in contact with the electrodes 24, and the lower surface 45 is in contact with the upper surface 11. Therefore, without an additional mechanism for fixing the optical cable connector 40A to the electronic device 20A, the optical cable connector 40A and the electronic device 20A are connected to each other so that signal transmission can occur between the inserting part 41 and the electronic device 20A.

Since the optical cable connector 40A is connected to the electronic device 20A after the electronic device 20 is mounted on the wiring board 10A, the optical cable 90 and the signal converting element 50A, 50B or 50C can be prevented from deteriorating due to the heat for reflowing.

Inserting the inserting part 41 in parallel to the straight line L2 between the plurality of connecting bodies 31A arranged along the straight line L1 and the plurality of connecting bodies 31A arranged along the straight line L2 facilitates alignment between the electrodes 24 and the spring members 46. Inserting the inserting part 41 in parallel to the straight line L2 between the plurality of connecting bodies 31A arranged along the straight line L2 and the plurality of connecting bodies 31A arranged along the straight line L3 facilitates alignment between the electrodes 24 and the spring members 46. Bringing the inserting part 41 into contact with the connecting bodies 31A arranged along the straight line L1 or L2 further facilitates alignment between the electrodes 24 and the spring members 46.

Inserting the inserting part 41 between the electronic device 20A and the wiring board 10A until the stopper part 43 abuts against the electronic device 20A further facilitates alignment between the electrodes 24 and the spring members 46.

Note that connecting the optical cable 90 to the optical cable connector 40A before insertion of the inserting part 41 facilitates optical alignment between the optical cable 90 and the signal converting element 50A, 50B or 50C. However, the optical cable 90 can also be connected to the optical cable connector 40A after insertion of the inserting part 41.

The optical cable connector 40A is held between the electronic device 20A and the wiring board 10A by the action of the frictional forces between the contact surface 47 and the electrodes 24 and between the lower surface 45 and the upper surface 11. Therefore, the optical cable connector 40A can be removed from, and connected again to, the electronic device 20A.

If the optical cable connector 40A does not need to be removed from the electronic device 20A, the electronic device 20A and the optical cable connector 40A are preferably fixed to each other as described below.

Figure 8:
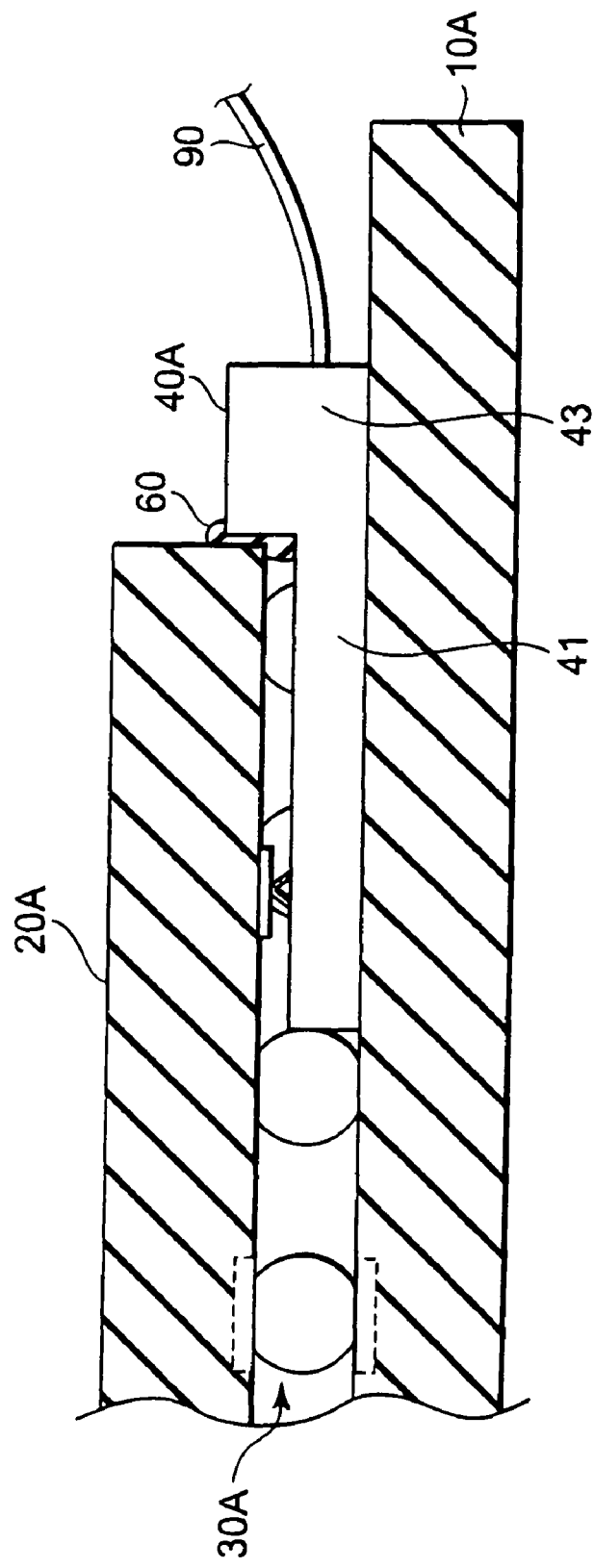
FIG. 8 is a side view of the optical transmission apparatus in which the optical cable connector is bonded to the electronic device.

For example, as shown in FIG. 8, the stopper part 43 is bonded to the electronic device 20A with an adhesive 60 when the inserting part 41 is inserted.

Figure 9:
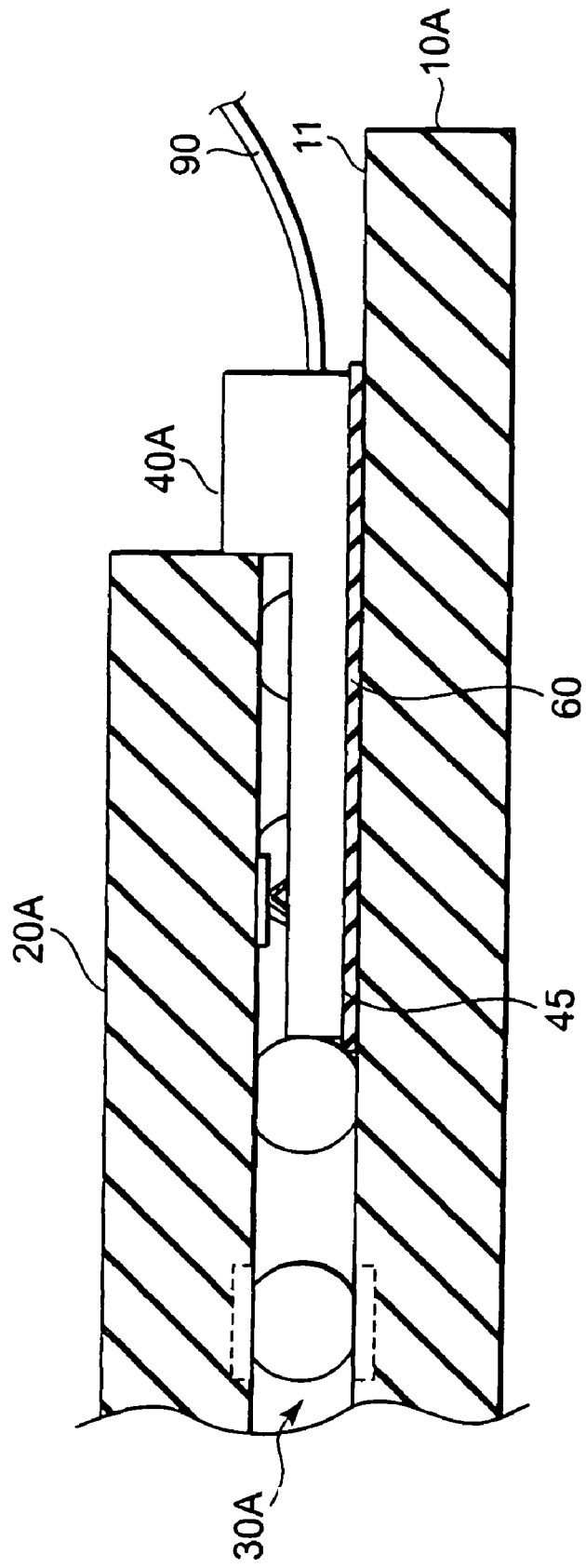
FIG. 9 is a side view of the optical transmission apparatus in which the optical cable connector is bonded to a wiring board.
Figure 10:
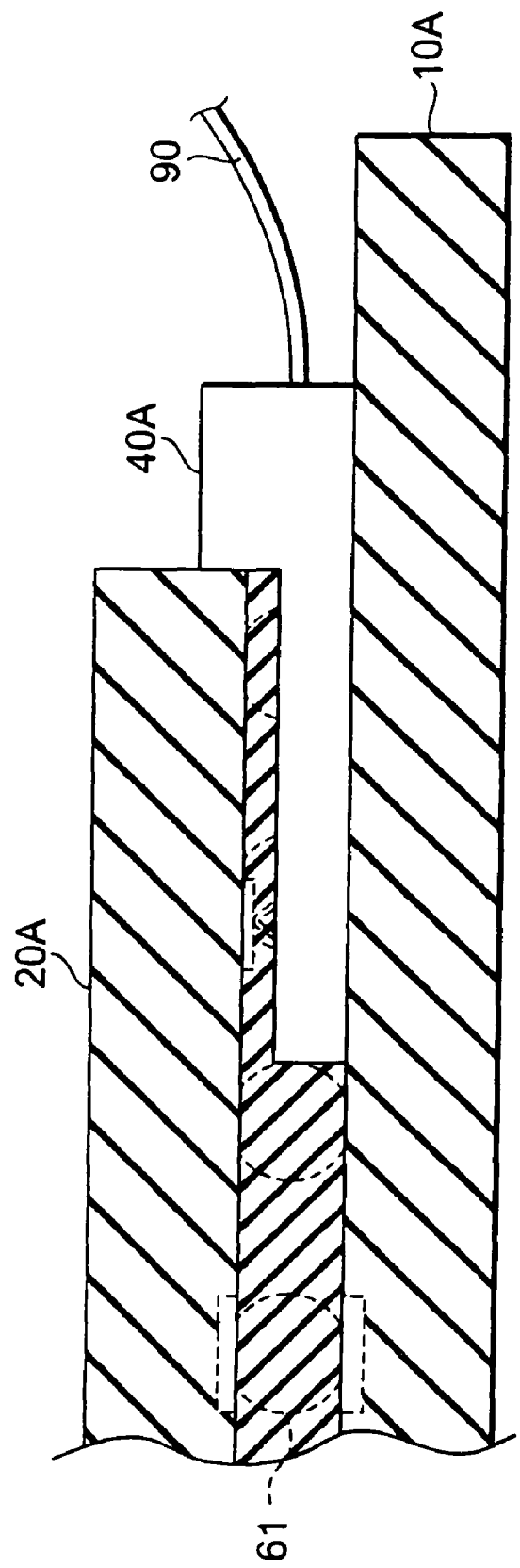
FIG. 10 is a side view of the optical transmission apparatus in which the space between the electronic device and the wiring board is filled with an underfill.

Alternatively, as shown in FIG. 9, the lower surface 45 may be bonded to the upper surface 11 with the adhesive 60 when the inserting part 41 is inserted.

To prevent heat deterioration of the optical cable 90 and the signal converting element 50A, 50B or 50C, the adhesive 60 preferably does not need heating to high temperature. For example, the adhesive 60 is a thermoplastic resin having a melting point of about 100 degrees C. or a thermosetting resin having a curing temperature of about 100 degrees C. Alternatively, the adhesive 60 may be an epoxy adhesive that cures at room temperature.

Alternatively, the space between the electronic device 20A and the wiring board 10A may be filled with an underfill 61 after the insertion of the inserting part 41 so that the underfill 61 connects the optical cable connector 40A and the electronic device 20A to each other and connects the optical cable connector 40A and the wiring board 10A. The underfill 61 liquefies at about 100 degrees C., which does not cause heat deterioration of the optical cable 90 and the signal converting element 50A, 50B or 50C.

Second Embodiment

As shown in FIG. 11, an optical transmission apparatus according to a second embodiment of the present invention comprises the wiring board 10A, an electronic device 20B mounted on the wiring board 10A, the connection part 30A, an optical cable connector 40B, the optical cable 90 connected to the optical cable connector 40B, and an electronic device 80 mounted on the electronic device 20B. The electronic device 20B differs from the electronic device 20A in that the electronic device 20B additionally has electrodes 26, and the electrodes 24 forming the signal connection part of the electronic device 20A are replaced with electrodes 25A. The electrodes 26 are provided on an upper surface 21 of the electronic device 20B. The electronic device 80 has a lower surface 82 facing the upper surface 21 and electrodes 83 provided on the lower surface 82. The lower surface 82 is sometimes referred to also as a rear surface 82. The electrodes 83 are connected to the electrodes 26 via connecting bodies 85. The connecting bodies 85 are solder balls. The optical cable connector 40B differs from the optical cable connector 40A in that the spring members 46 forming the signal connection part of the optical cable connector 40A are replaced with electrodes 70A.

Figure 12A:
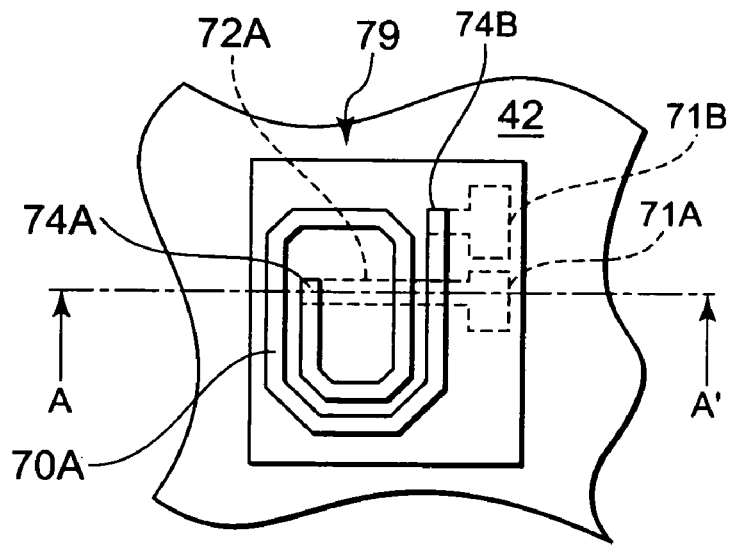
FIG. 12A is a plan view of an inductive coupling electrode of an optical cable connector according to the second embodiment.

Referring to FIG. 12A, the electrode 70A is formed in an opening 79 formed in the inserting part 41. In FIG. 12A, a protective layer 75 described later is not illustrated, and thus the electrode 70A is exposed. The electrode 70A is formed in an upper wiring layer formed in the opening 79 and has the shape of a coil or loop. A pad 71A and a pad 71B are formed in a lower wiring layer formed in the opening 79. The pad 71A is connected to lower wiring 72A formed in the lower wiring layer. One end of the electrode 70A is connected to the lower wiring 72A through a through-hole 74A. The other end of the electrode 70A is connected to the pad 71B through a through-hole 74B.

Figure 12B:
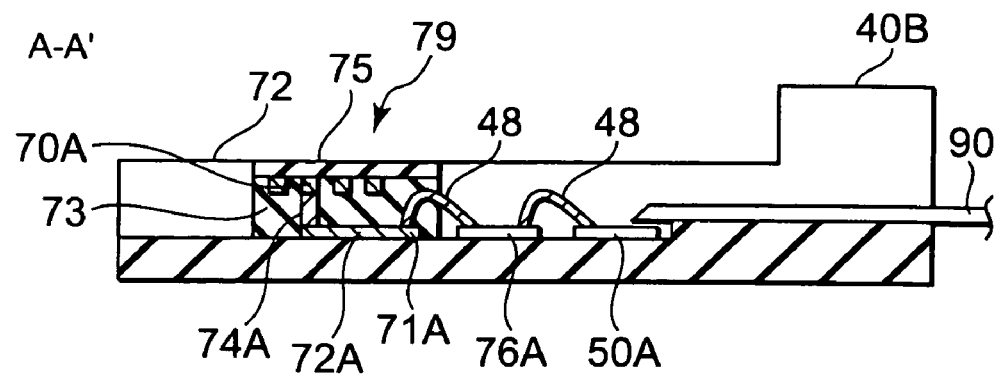
FIG. 12B is a cross-sectional view of the optical cable connector according to the second embodiment.

Referring to FIG. 12B, the optical cable connector 40B has a converter integrated circuit (IC) 76A. The converter IC 76A is connected to the signal converting element 50A by the wire 48. An insulating layer 73 is formed between the upper wiring layer in which the electrode 70A is formed and the lower wiring layer in which the lower wiring 72A is formed. The protective layer 75 is formed to cover the electrode 70A. The through-holes 74A and 74B are formed in the insulating layer 73. The pads 71A and 71B are connected to the converter IC 76A by the wire 48. The signal converting element 50A may be replaced with the signal converting element 50B or 50C.

Figure 13A:
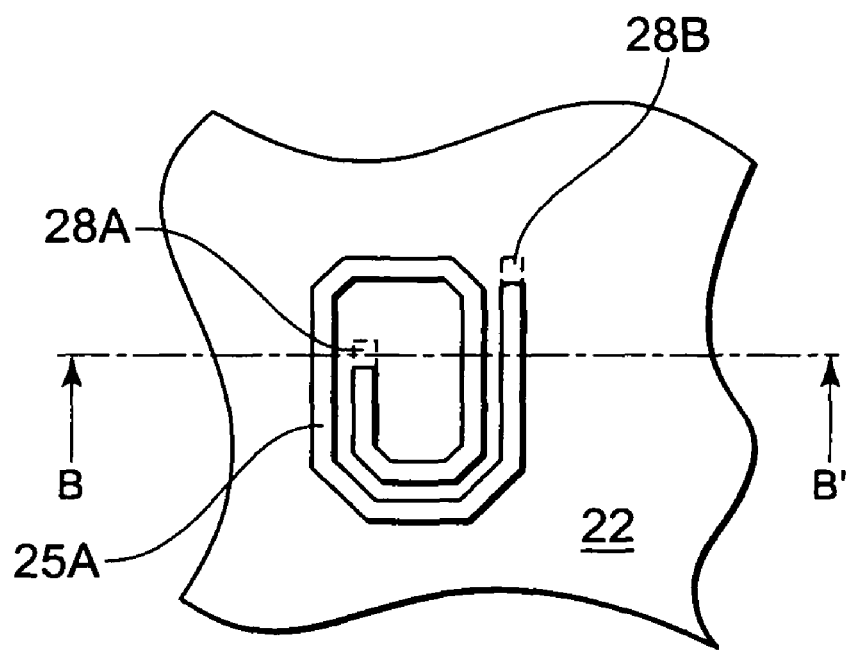
FIG. 13A is a plan view of an inductive coupling electrode of an electronic device according to the second embodiment.
Figure 13B:
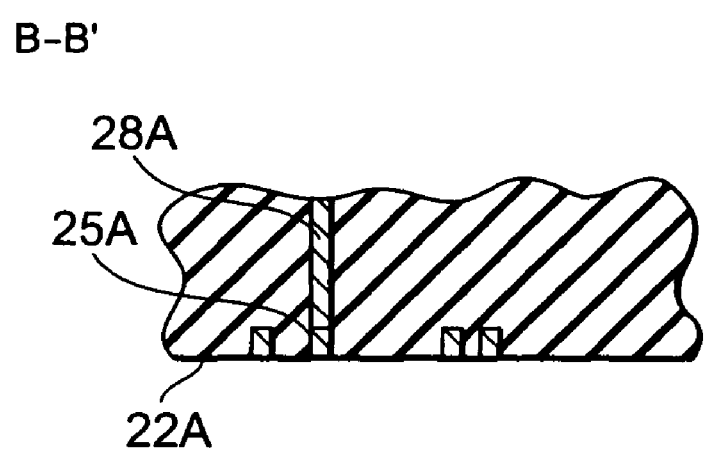
FIG. 13B is a cross-sectional view of the inductive coupling electrode of the electronic device according to the second embodiment.

Referring to FIGS. 13A and 13B, the electrodes 25A are formed in a wiring layer in which the electrodes 23 are formed and have the shape of a coil or loop. The electrode 25A is connected to a through-hole 28A at one end and to a through-hole 28B at the other end.

Once the inserting part 41 of the optical cable connector 40B is inserted between the electronic device 20B and the wiring board 10A, the electrodes 25A and the electrodes 70A are inductively coupled to each other. Thus, electrical signal transmission occurs between the electrodes 25A and the electrodes 70A.

The optical transmission apparatus according to this embodiment is manufactured in the same manner as the optical transmission apparatus according to the first embodiment.

Third Embodiment

As shown in FIG. 14, an optical transmission apparatus according to a third embodiment of the present invention comprises the wiring board 10A, an electronic device 20C mounted on the wiring board 10A, the connection part 30A, an optical cable connector 40C, the optical cable 90 connected to the optical cable connector 40C, and the electronic device 80 mounted on the electronic device 20C. The electronic device 20C differs from the electronic device 20A in that the electronic device 20C additionally has the electrodes 26, and the electrodes 24 forming the signal connection part of the electronic device 20A are replaced with electrodes 25B. The electrodes 26 are provided on an upper surface 21 of the electronic device 20C. The electrodes 83 are connected to the electrodes 26 via the connecting bodies 85. The optical cable connector 40C differs from the optical cable connector 40A in that the spring members 46 forming the signal connection part of the optical cable connector 40A are replaced with electrodes 70B.

Figure 15A:
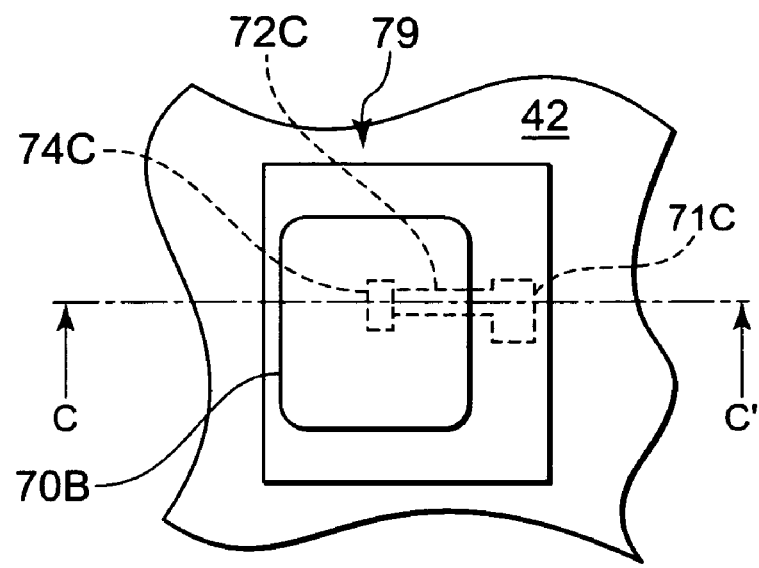
FIG. 15A is a plan view of a capacitive coupling electrode of an optical cable connector according to the third embodiment.

Referring to FIG. 15A, the electrode 70B is formed in an opening 79 formed in the inserting part 41. In FIG. 15A, the protective layer 75 described later is not illustrated, and thus the electrode 70B is exposed. The electrode 70B is formed in an upper wiring layer formed in the opening 79 and has a planar shape. A pad 71C and lower wiring 72C are formed in a lower wiring layer formed in the opening 79. The electrode 70B is connected to the lower wiring 72C through a through-hole 74C. The lower wiring 72C is connected to the pad 71C.

Figure 15B:
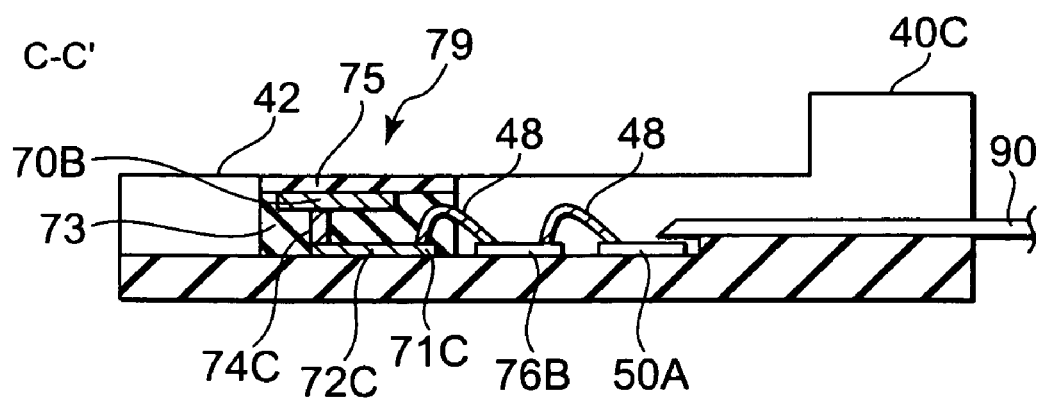
FIG. 15B is a cross-sectional view of the optical cable connector according to the third embodiment.

Referring to FIG. 15B, the optical cable connector 40C has a converter integrated circuit (IC) 76B. The converter IC 76B is connected to the signal converting element 50A by the wire 48. An insulating layer 73 is formed between the upper wiring layer in which the electrode 70B is formed and the lower wiring layer in which the lower wiring 72C and the pad 71 are formed. The protective layer 75 is formed to cover the electrode 70B. The through-hole 74C is formed in the insulating layer 73. The pad 71C is connected to the converter IC 76B by the wire 48. The signal converting element 50A may be replaced with the signal converting element 50B or 50C.

Figure 16A:
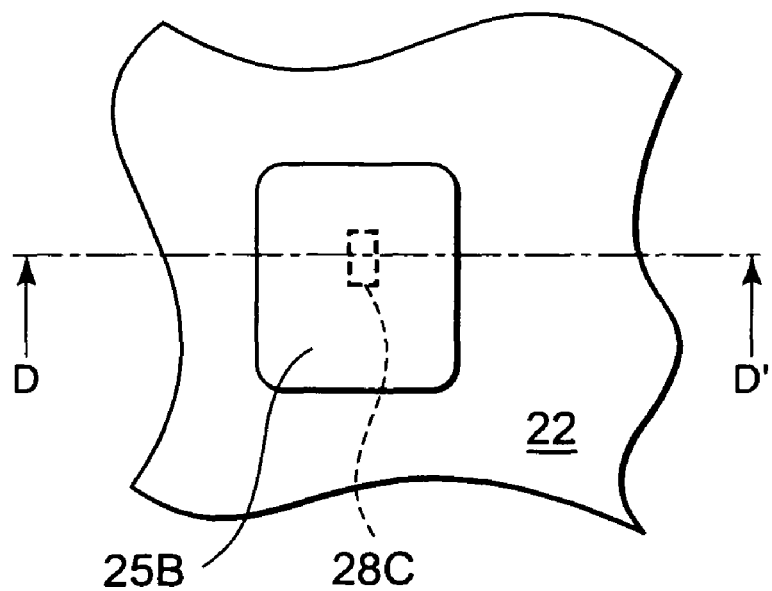
FIG. 16A is a plan view of a capacitive coupling electrode of an electronic device according to the third embodiment.
Figure 16B:
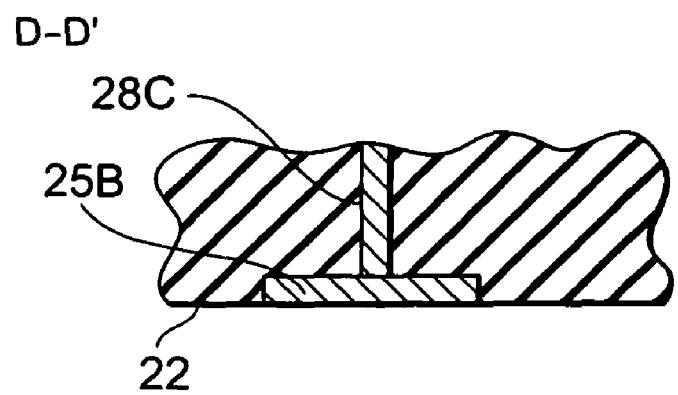
FIG. 16B is a cross-sectional view of the capacitive coupling electrode of the electronic device according to the third embodiment.

Referring to FIGS. 16A and 16B, the electrodes 25B are formed in a wiring layer in which the electrodes 23 are formed and have a planar shape. The electrode 25B is connected to a through-hole 28C.

Once the inserting part 41 of the optical cable connector 40C is inserted between the electronic device 20C and the wiring board 10A, the electrodes 25B and the electrodes 70B are capacitively coupled to each other. Thus, electrical signal transmission occurs between the electrodes 25B and the electrodes 70B.

The optical transmission apparatus according to this embodiment is manufactured in the same manner as the optical transmission apparatus according to the first embodiment.

Fourth Embodiment

As shown in FIG. 17, an optical transmission apparatus according to a fourth embodiment of the present invention comprises the wiring board 10A, an electronic device 20D mounted on the wiring board 10A, the connection part 30A, an optical cable connector 40D, and the optical cable 90 connected to the optical cable connector 40D. The electronic device 20D is a modification of the electronic device 20A in which the plurality of electrodes 24 are arranged in a plurality of rows. The optical cable connector 40D is a modification of the optical cable connector 40A in which the plurality of spring members 46 are arranged in a plurality of rows.

As shown in FIG. 18, a plurality of electrodes 24 are arranged along a straight line L4 that is perpendicular to the straight lines L1, L2 and L3, and a plurality of electrodes 24 are arranged along a straight line L5 that is parallel to the straight line L4. Since the contacts between the electrodes 24 and the spring members 46 are arranged two-dimensionally, the optical cable connector 40D is steadily held between the electronic device 20D and the wiring board 10A simply by inserting the optical cable connector 40D between the electronic device 20D and the wiring board 10A.

The optical transmission apparatus according to this embodiment is manufactured in the same manner as the optical transmission apparatus according to the first embodiment.

Fifth Embodiment

As shown in FIG. 19, an optical transmission apparatus according to a fifth embodiment of the present invention comprises a wiring board 10D, the electronic device 20D mounted on the wiring board 10D, the connection part 30A, an optical cable connector 40E, and the optical cable 90 connected to the optical cable connector 40E. The wiring board 10D differs from the wiring board 10A in that the wiring board 10D additionally has a plurality of electrodes 13A and a plurality of electrodes 13B. The electrodes 13A and 13B are provided on the upper surface 11. The electrodes 13A and 13B may or may not protrude from the upper surface 11. The electrodes 13A and 13B can be formed by the wiring layer in which the electrodes 12 are formed. The optical cable connector 40E differs from the optical cable connector 40D in that the inserting part 41 additionally has a plurality of spring members 81A and a plurality of spring members 81B. Each of the spring members 81A and 81B is made of a conductor and is connected to a circuit provided on the optical cable connector 40E, such as the signal converting element 50A, 50B or 50C. The plurality of spring members 81A and the plurality of electrodes 13A are associated with each other in a one-to-one relationship, and the plurality of spring members 81B and the plurality of electrodes 13B are associated with each other in a one-to-one relationship. The pairs of spring members 81A and electrodes 13A or the pairs of spring members 81B and electrodes 13B are used for electrical signal transmission, and the other pairs are used for power supply from the wiring board 10D to the circuit. The spring members 81A and 81B protrude from the lower surface 45. The plurality of spring members 81A are arranged opposite to the plurality of spring members 46 that are in contact with the plurality of electrodes 24 arranged along the straight line L4. The plurality of spring members 81B are arranged opposite to the plurality of spring members 46 that are in contact with the plurality of electrodes 24 arranged along the straight line L5.

The contact surface 47 of the spring member 46 is in contact with the electrode 24. The spring member 81A has a contact surface that is in contact with the electrode 13A. The spring member 81B has a contact surface that is in contact with the electrode 13B. The spring member 46 presses the contact surface 47 against the electrode 24, the spring member 81A presses the contact surface thereof against the electrode 13A, and the spring member 81B presses the contact surface thereof against the electrode 13B.

The optical transmission apparatus according to this embodiment is manufactured in the same manner as the optical transmission apparatus according to the first embodiment. However, when the optical cable connector 40E is connected to the electronic device 20D, the inserting part 41 is inserted between the electronic device 20D and the wiring board 10D so that the spring members 46 come into contact with the electrodes 24, the spring members 81A come into contact with the electrodes 13A, and the spring members 81B come into contact with the electrodes 13B.

Sixth Embodiment

Figure 20:
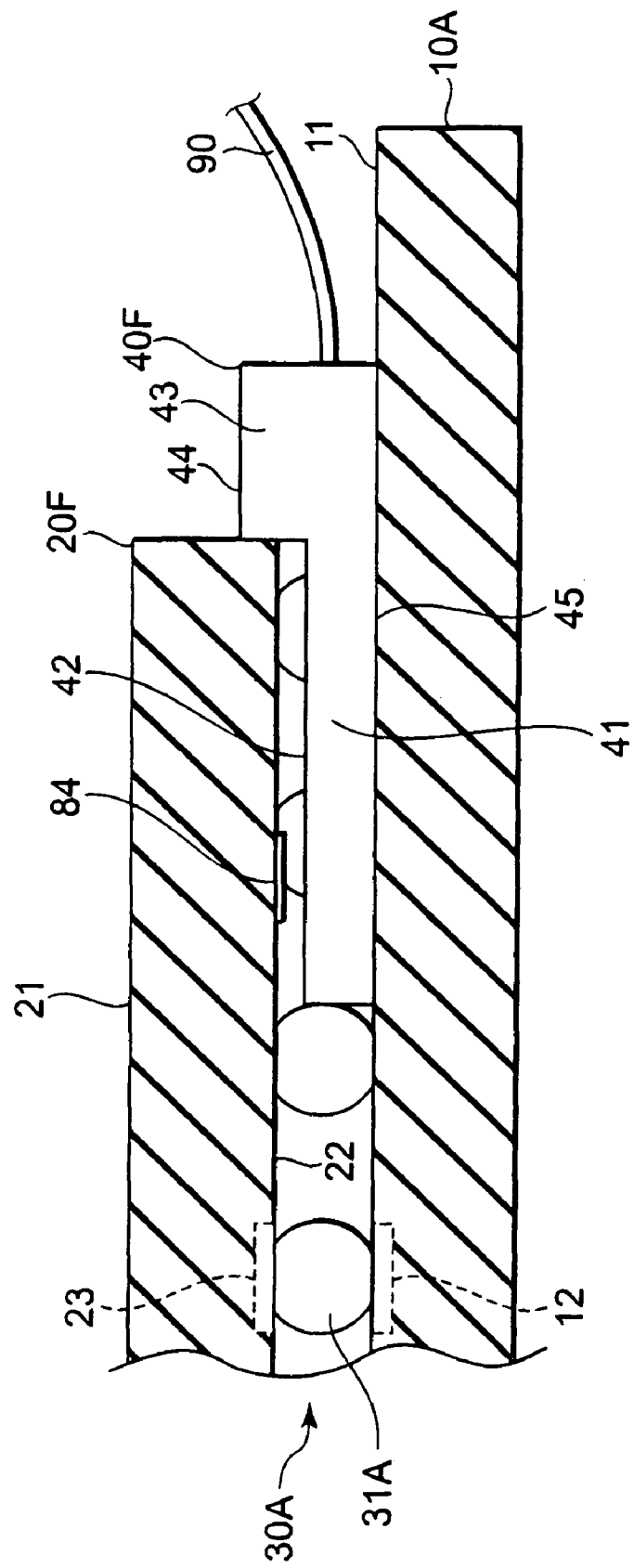
FIG. 20 is a side view of an optical transmission apparatus according to a sixth embodiment of the present invention.

As shown in FIG. 20, an optical transmission apparatus according to a sixth embodiment of the present invention comprises the wiring board 10A, an electronic device 20F mounted on the wiring board 10A, the connection part 30A, an optical cable connector 40F, and the optical cable 90 connected to the optical cable connector 40F. The electronic device 20F differs from the electronic device 20A in that the plurality of electrodes 24 of the electronic device 20A are replaced with signal converting elements 84. The signal converting elements 84 are light emitting elements or light receiving elements. The optical cable connector 40F differs from the optical cable connector 40A in that the spring members 46, the wires 48 and the signal converting element 50A of the optical cable connector 40A are removed. An optical signal transmitted through the optical cable 90 is transmitted between the signal converting elements 84 and the inserting part 41. The signal converting elements 84 convert the optical signal into the electrical signal and vice versa.

Figure 21:
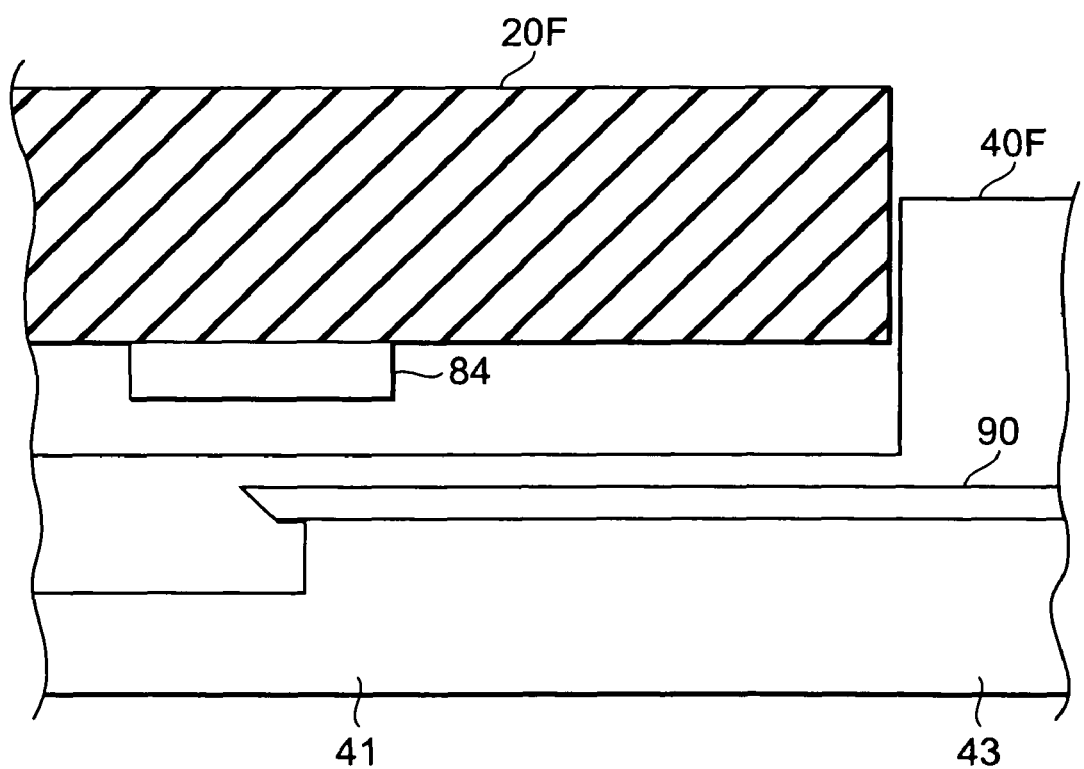
FIG. 21 is a cross-sectional view of an optical cable connector according to the sixth embodiment.

As shown in FIG. 21, the end of the optical cable 90 is disposed on the inserting part 41 of the optical cable connector 40F to face the signal converting elements 84. Optical signal transmission occurs between the end of the optical cable 90 and the signal converting elements 84.

In the following, a method of manufacturing the optical transmission apparatus according to this embodiment will be described.

First, as in the first embodiment, the electronic device 20F is mounted on the wiring board 10A. Then, the inserting part 41 is inserted between the electronic device 20F and the wiring board 10A until the stopper part 43 abuts against or come into contact with the electronic device 20F. Alternatively, the inserting part 41 may be inserted between the electronic device 20F and the wiring board 10A in parallel to the straight line L2 so that the inserting part 41 is disposed in contact with the plurality of connecting bodies 31A arranged along the straight line L1 or the plurality of connecting bodies 31A arranged along the straight line L2 between the connecting bodies 31A arranged along the straight line L1 and the connecting bodies 31A arranged along the straight line L2. Then, the stopper part 43 is bonded to the electronic device 20F, or the lower surface 45 is bonded to the upper surface 11. Therefore, without an additional mechanism for fixing the optical cable connector 40F to the electronic device 20F, the optical cable connector 40F and the electronic device 20F are connected to each other so that signal transmission can occur between the inserting part 41 and the electronic device 20F.

Seventh Embodiment

Figure 22:
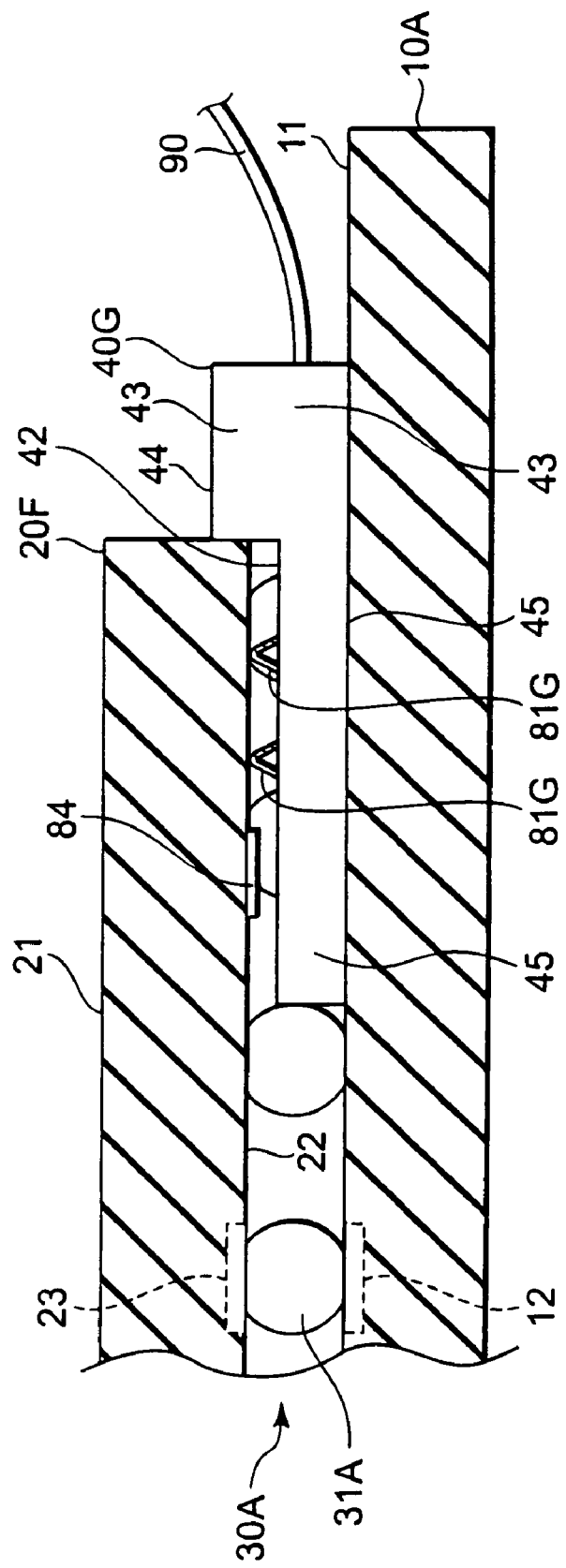
FIG. 22 is a side view of an optical transmission apparatus according to a seventh embodiment of the present invention.

As shown in FIG. 22, an optical transmission apparatus according to a seventh embodiment of the present invention comprises the wiring board 10A, the electronic device 20F mounted on the wiring board 10A, the connection part 30A, an optical cable connector 40G, and the optical cable 90 connected to the optical cable connector 40G. The optical cable connector 40G is a modification of the optical cable connector 40F in which the inserting part 41 has spring members 81G. The spring members 81G protrude from the upper surface 42. The spring members 81G are made of a conductor or dielectric. The spring members 81G have a contact surface in contact with the lower surface 22. The lower surface 45 is in contact with the upper surface 11. The spring members 81G press their respective contact surfaces against the lower surface 22 and press the lower surface 45 against the upper surface 11.

In the following, a method of manufacturing the optical transmission apparatus according to this embodiment will be described.

First, as in the first embodiment, the electronic device 20F is mounted on the wiring board 10A. Then, the inserting part 41 is inserted between the electronic device 20F and the wiring board 10A so that the spring members 81G are in contact with the lower surface 22, and the lower surface 45 is in contact with the upper surface 11. Therefore, without an additional mechanism for fixing the optical cable connector 40G to the electronic device 20F, the optical cable connector 40G and the electronic device 20F are connected to each other so that signal transmission can occur between the inserting part 41 and the electronic device 20F.

The optical cable connector 40G is held between the electronic device 20F and the wiring board 10A by the action of the frictional forces between the spring members 81G and the lower surface 22 and between the lower surface 45 and the upper surface 11. Therefore, the optical cable connector 40G can be removed from, and connected again to, the electronic device 20F.

Eighth Embodiment

Figure 23:
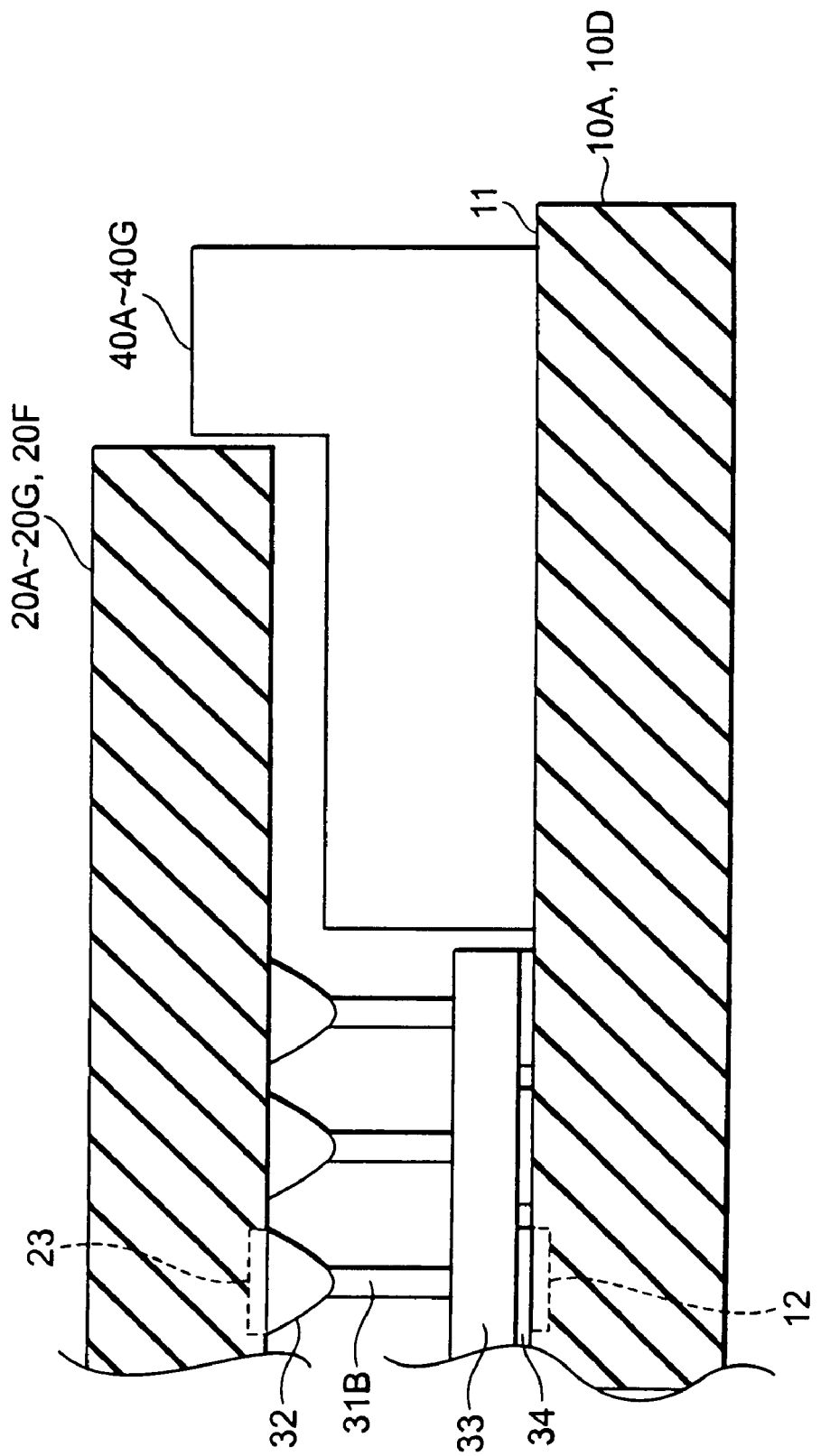
FIG. 23 is a side view of an optical transmission apparatus according to an eighth embodiment of the present invention.

Referring to FIG. 23, an optical transmission apparatus according to an eighth embodiment of the present invention will be described. The optical transmission apparatus according to this embodiment is a modification of the optical transmission apparatus according to the first to seventh embodiments in which the connection part 30A is replaced with a connection part 30B. The connection part 30B mechanically connects the electronic device (20A, 20B, 20C, 20D or 20F) and the wiring board (10A or 10D) to each other in such a manner that the electronic device and the wiring board face each other at a certain distance and at the same time electrically connects the electronic device and the wiring board to each other. The connection part 30B is a pin grid array and has a plurality of connecting bodies 31B and a socket 33. The connecting bodies 31B are pins connected to the electrodes 23 by solder 32 and are connected to the electrodes 12 via the socket 33.

Figure 24:
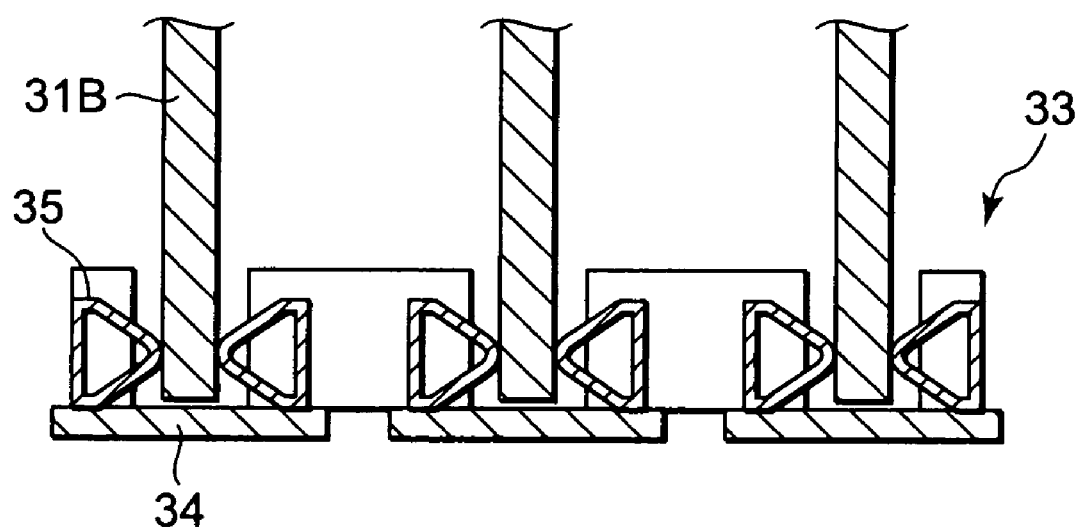
FIG. 24 is a cross-sectional view of a socket according to the eighth embodiment.

As shown in FIG. 24, the socket 33 has terminals 34 to be connected to the electrodes 12 and pairs of spring members 35 connected to the terminals 34. The spring members 35 are made of a conductor and are in contact with the connecting bodies 31B.

A method of manufacturing the optical transmission apparatus according to this embodiment is a modification of the methods of manufacturing the optical transmission apparatus according to the first to seventh embodiments in which the step of mounting the electronic device on the wiring board is modified. In the step of mounting the electronic device on the wiring board according to this embodiment, the socket 33 is fixed on the upper surface 11 in such a manner that the terminals 34 are connected to the electrodes 12. Then, the connecting bodies 31B connected to the electrodes 23 by the solder 32 are inserted between the paired spring members 35 to connect the connecting bodies 31B and the spring members 35 to each other. In this way, the connection part 30B mechanically connects the electronic device and the wiring board to each other in such a manner that the electronic device and the wiring board face each other at a certain distance and at the same time electrically connects the electronic device and the wiring board to each other.

Ninth Embodiment

Figure 25:
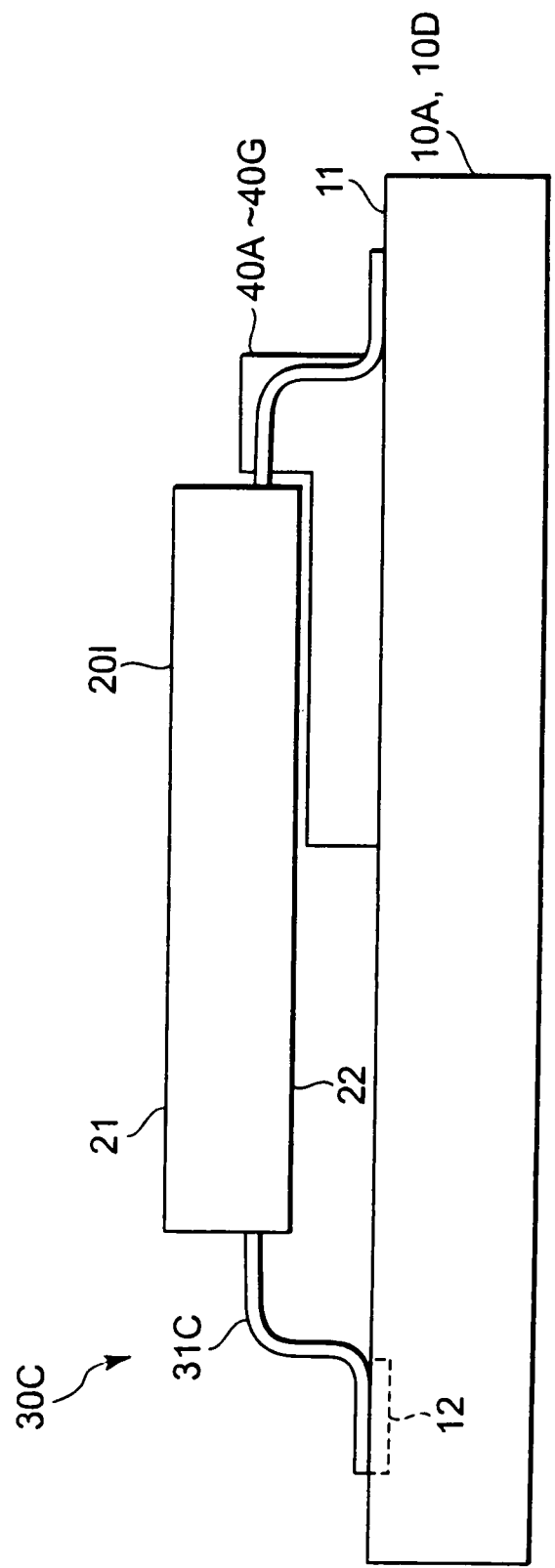
FIG. 25 is a side view of an optical transmission apparatus according to a ninth embodiment of the present invention.
Figure 26:
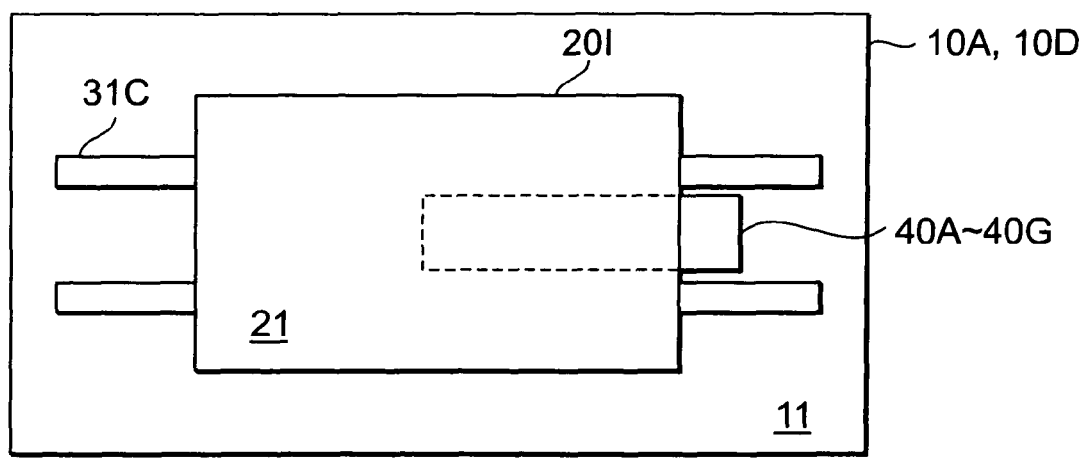
FIG. 26 is a plan view of the optical transmission apparatus according to the ninth embodiment.

Referring to FIGS. 25 and 26, an optical transmission apparatus according to a ninth embodiment of the present invention will be described. The optical transmission apparatus according to this embodiment differs from the optical transmission apparatus according to the first to seventh embodiments in that the connection part 30A is replaced with a connection part 30C, and the electronic device (20A, 20B, 20C, 20D or 20F) is replaced with an electronic device 20I. The connection part 30C mechanically connects the electronic device 20I and the wiring board (10A or 10D) to each other in such a manner that the electronic device 20I and the wiring board face each other at a certain distance and at the same time electrically connects the electronic device 20I and the wiring board to each other. The connection part 30C has a plurality of connecting bodies 31C. The connecting bodies 31C are leads. The electronic device 20I differs from the electronic device (20A, 20B, 20C, 20D or 20F) in that the electrodes 23 are replaced with lines connected to the connecting bodies 31C. The connecting bodies 31C are connected to the electrodes 12.

A method of manufacturing the optical transmission apparatus according to this embodiment is a modification of the methods of manufacturing the optical transmission apparatus according to the first to seventh embodiments in which the step of mounting the electronic device on the wiring board is modified. In the step of mounting the electronic device on the wiring board according to this embodiment, the connecting bodies 31C are connected to the electrodes 12 by soldering, for example. In this way, the connection part 30C mechanically connects the electronic device and the wiring board to each other in such a manner that the electronic device and the wiring board face each other at a certain distance and at the same time electrically connects the electronic device and the wiring board to each other.

The embodiments described above can be combined to each other. In the embodiments described above, the electronic device may not be a semiconductor device but may be a device composed only of a wiring board.

It is apparent that the present invention is not limited to the above embodiments, and the embodiments can be modified and changed as appropriate within the scope of the technical concept of the present invention.

(Reference: Method Claims)

13. A method of manufacturing an optical transmission apparatus, comprising:
 mounting an electronic device on a wiring board; and
 inserting a first part of an optical cable connector connected to an optical cable between the electronic device and the wiring board in such a manner that the optical cable connector is in contact with the electronic device or a connection part,
 wherein the mounting an electronic device includes mechanically connecting the electronic device and the wiring board to each other by the connection part in such a manner that the electronic device and the wiring board face each other at a certain distance,
 the connection part electrically connects the electronic device and the wiring board to each other, and
 a signal is transmitted between the first part and the electronic device.

14. The method of manufacturing the optical transmission apparatus according to claim 13, wherein the first part comprises an electronic-device contact surface that is pressed against the electronic device by a first spring member and a wiring-board contact surface that is pressed against the wiring board by the first spring member.

15. The method of manufacturing an optical transmission apparatus according to claim 13, wherein the optical cable connector includes a second part that has a thickness greater than the distance, and
 in the inserting the first part, the first part is inserted between the electronic device and the wiring board until the second part abuts against the electronic device.

16. The method of manufacturing the optical transmission apparatus according to claim 13, wherein the connection part includes a plurality of first connecting bodies arranged along a first straight line and a plurality of second connecting bodies arranged along a second straight line that is parallel to the first straight line, and
 in the inserting the first part, the first part is inserted between the plurality of first connecting bodies and the plurality of second connecting bodies in parallel to the first straight line.

17. The method of manufacturing the optical transmission apparatus according to claim 13, further comprising:
 bonding the optical cable connector to the electronic device or the wiring board.

18. The method of manufacturing the optical transmission apparatus according to claim 13, further comprising:
 connecting the optical cable to the optical cable connector before the inserting the first part.

What is claimed is:

1. An optical transmission apparatus, comprising:
 a wiring board;
 an electronic device mounted on the wiring board;
 a connection part mechanically connecting the electronic device and the wiring board to each other so that the electronic device and the wiring board face each other at a predetermined distance, and electrically connecting the electronic device and the wiring board to each other;
 an optical cable connector connected to the electronic device or the connection part; and
 an optical cable connected to the optical cable connector,
 wherein the optical cable connector includes a first part inserted between the electronic device and the wiring board, and
 a signal is transmitted between the first part and the electronic device.

2. The optical transmission apparatus according to claim 1 wherein the first part comprises:
 a metal protrusion connected to the electronic device; and
 a wiring-board contact surface pressed against the wiring board by the action of an elastic force of the metal protrusion.

3. The optical transmission apparatus according to claim 1 wherein the first part comprises:
 electronic-device contact surface pressed against the electronic device by a first spring member; and
 a wiring-board contact surface pressed against the wiring board by the first spring member.

4. The optical transmission apparatus according to claim 3 wherein the optical cable connector comprises a signal converting element converting an optical signal transmitted through the optical cable into an electrical signal serving as the signal and vice versa,
 the electronic device comprises an electronic-device-side power supply connection part,
 the first spring member forms a connector-side power supply connection part which has the electronic-device contact surface,
 the electronic-device contact surface is pressed against the electronic-device-side power supply connection part, and
 the electronic device supplies electric power to the signal converting element via the electronic-device-side power supply connection part and the connector-side power supply connection part.

5. The optical transmission apparatus according to claim 4 wherein the first part comprises a second spring member forming a connector-side signal connection part,
 the connector-side signal connection part is connected to the signal converting element and has a connector-side signal contact surface,
 the electronic device comprises an electronic-device-side signal connection part,
 the second spring member presses the connector-side signal contact surface against the electronic-device-side signal connection part, and the electrical signal is transmitted between the connector-side signal connection part and the electronic-device-side signal connection part.

6. The optical transmission apparatus according to claim 4, wherein the first part comprises a connector-side signal connection part connected to the signal converting element, electronic device comprises an electronic-device-side signal connection part, the connector-side signal connection part and the electronic-device-side signal connection part are inductively coupled to each other, and the electrical signal is transmitted between the connector-side signal connection part and the electronic-device-side signal connection part.

7. The optical transmission apparatus according to claim 4, wherein the first part comprises a connector-side signal connection part connected to the signal converting element, the electronic device comprises an electronic-device-side signal connection part, the connector-side signal connection part and the electronic-device-side signal connection part are capacitively coupled to each other, and the electrical signal is transmitted between the connector-side signal connection part and the electronic-device-side signal connection part.

8. The optical transmission apparatus according to claim 1, wherein the signal is an optical signal transmitted through the optical cable, and the electronic device comprises a signal converting element converting the optical signal into an electrical signal and vice versa.

9. The optical transmission apparatus according to claim 1, wherein the optical cable connector comprises a second part which has a thickness greater than the distance.

10. The optical transmission apparatus according to claim 1, wherein the connection part includes:

a plurality of first connecting bodies arranged along a first straight line; and a plurality of second connecting bodies arranged along a second straight line which is parallel to the first straight line, and the first part is inserted between the plurality of first connecting bodies and the plurality of second connecting bodies.

11. The optical transmission apparatus according to claim 1, wherein the optical cable connector is bonded to the wiring board or the electronic device.

12. The optical transmission apparatus according to claim 3, wherein the signal is an optical signal transmitted through the optical cable, and the electronic device comprises a signal converting element which converts the optical signal into an electrical signal and vice versa.

* * * * *